United States Patent
Terahara (12)

(10) Patent No.: US 6,501,592 B2
(45) Date of Patent: Dec. 31, 2002

(54) OPTICAL AMPLIFIER REFLECTING SPONTANEOUS EMISSION BACK INTO THE AMPLIFIER TO IMPROVE EFFICIENCY

(75) Inventor: Takafumi Terahara, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,908

(22) Filed: Apr. 26, 1999

(65) Prior Publication Data

US 2002/0044344 A1 Apr. 18, 2002

(30) Foreign Application Priority Data

Apr. 27, 1998 (JP) .............................. 10-117043

(51) Int. Cl.⁷ ................................................. H01S 3/00
(52) U.S. Cl. ........................................ 359/341; 359/345
(58) Field of Search .................. 359/341, 345

(56) References Cited

U.S. PATENT DOCUMENTS

| | | | |
|---|---|---|---|
| 5,136,420 A | 8/1992 | Inagaki et al. | |
| 5,138,483 A | 8/1992 | Grasso et al. | |
| 5,191,586 A | * 3/1993 | Huber | 359/341 |
| 5,283,686 A | * 2/1994 | Huber | 359/337 |
| 5,991,068 A | * 11/1999 | Massicott et al. | 359/337 |

FOREIGN PATENT DOCUMENTS

| | | |
|---|---|---|
| JP | 2-153327 | 6/1990 |
| JP | 3-135081 | 6/1991 |
| JP | 4-191826 | 7/1992 |

* cited by examiner

*Primary Examiner*—Stephen C. Buczinski
(74) *Attorney, Agent, or Firm*—Staas & Halsey LLP

(57) ABSTRACT

An optical amplifier having a reflector to reflect spontaneous emission light back into the amplifier, to improve excitation efficiency. More specifically, the optical amplifier includes an optical fiber and a reflector. The optical fiber is doped with a rare earth element. An excitation light is provided to the optical fiber so that a light signal is amplified as the light signal travels through the optical fiber. Spontaneous emission light is generated in the optical fiber and travels in a direction out of the optical fiber. The reflector reflects the spontaneous emission light back into the optical fiber.

79 Claims, 13 Drawing Sheets

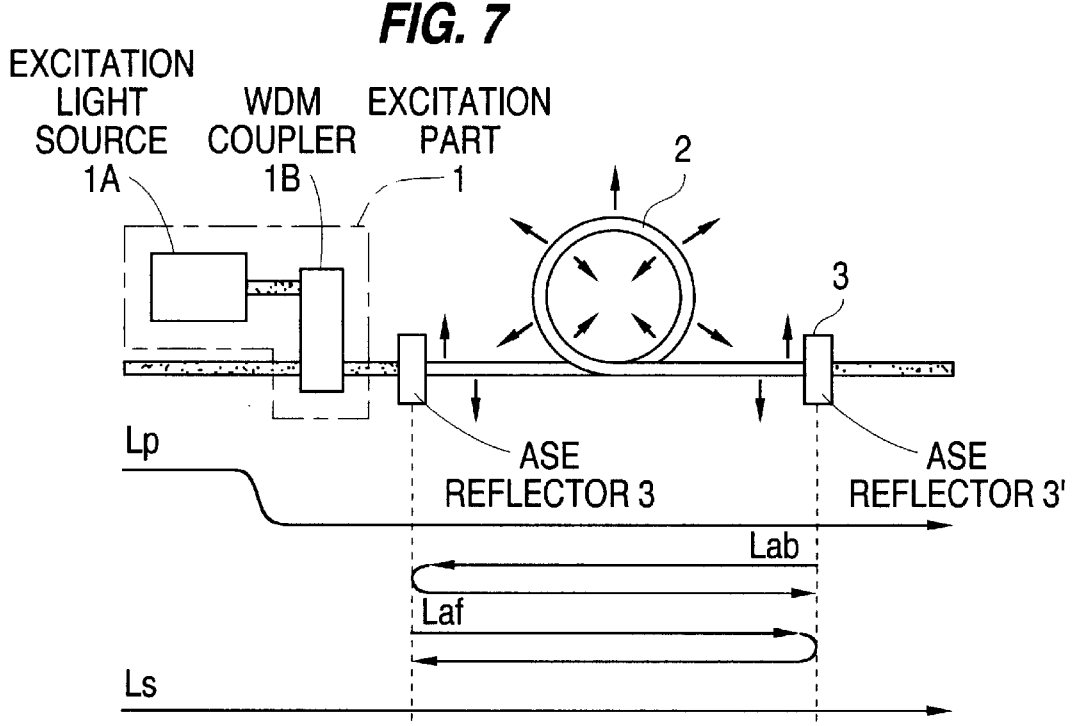
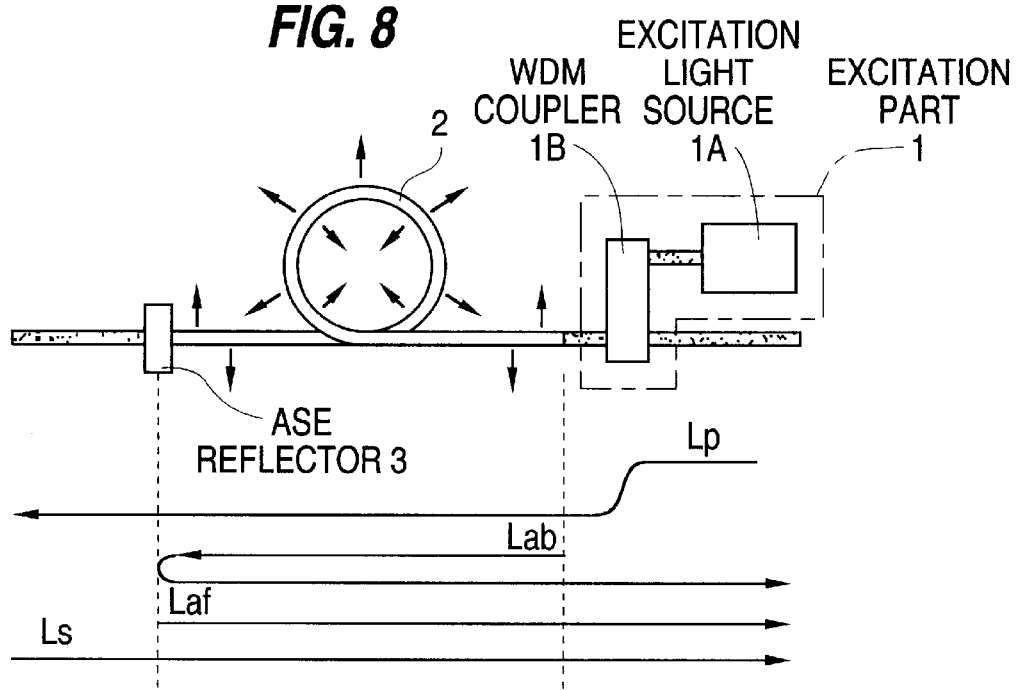

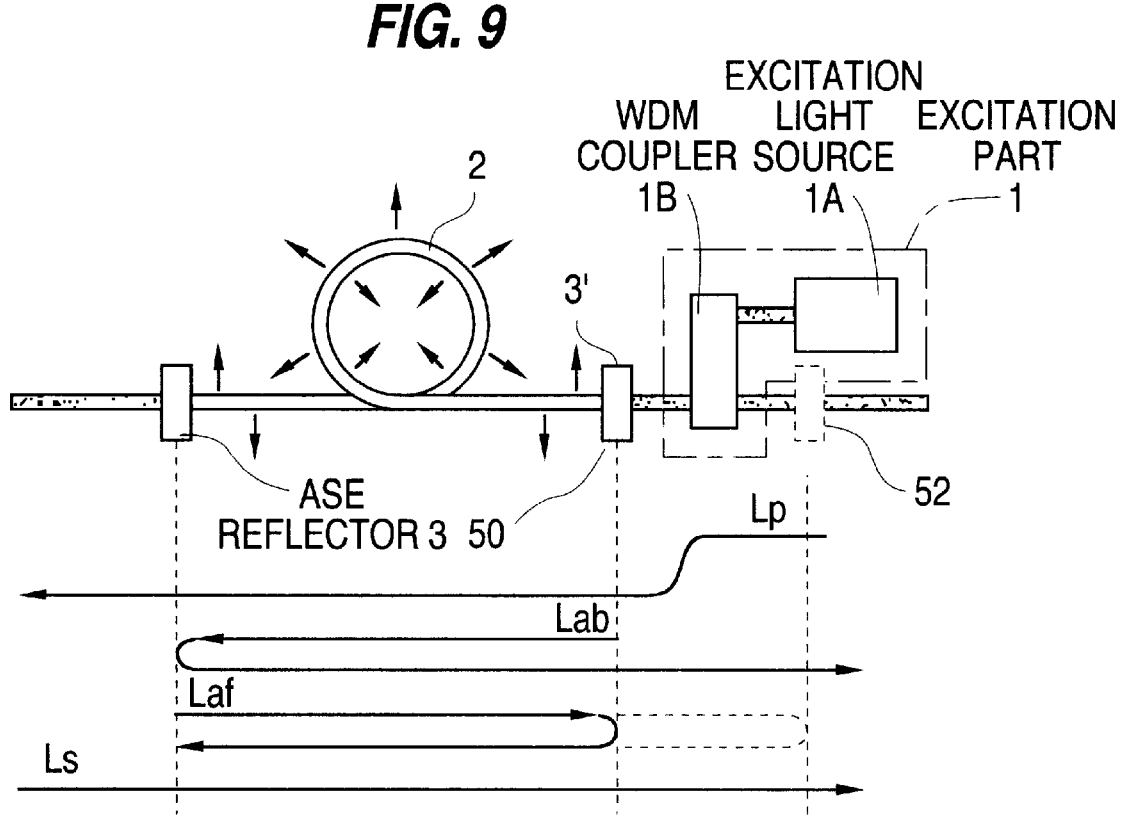

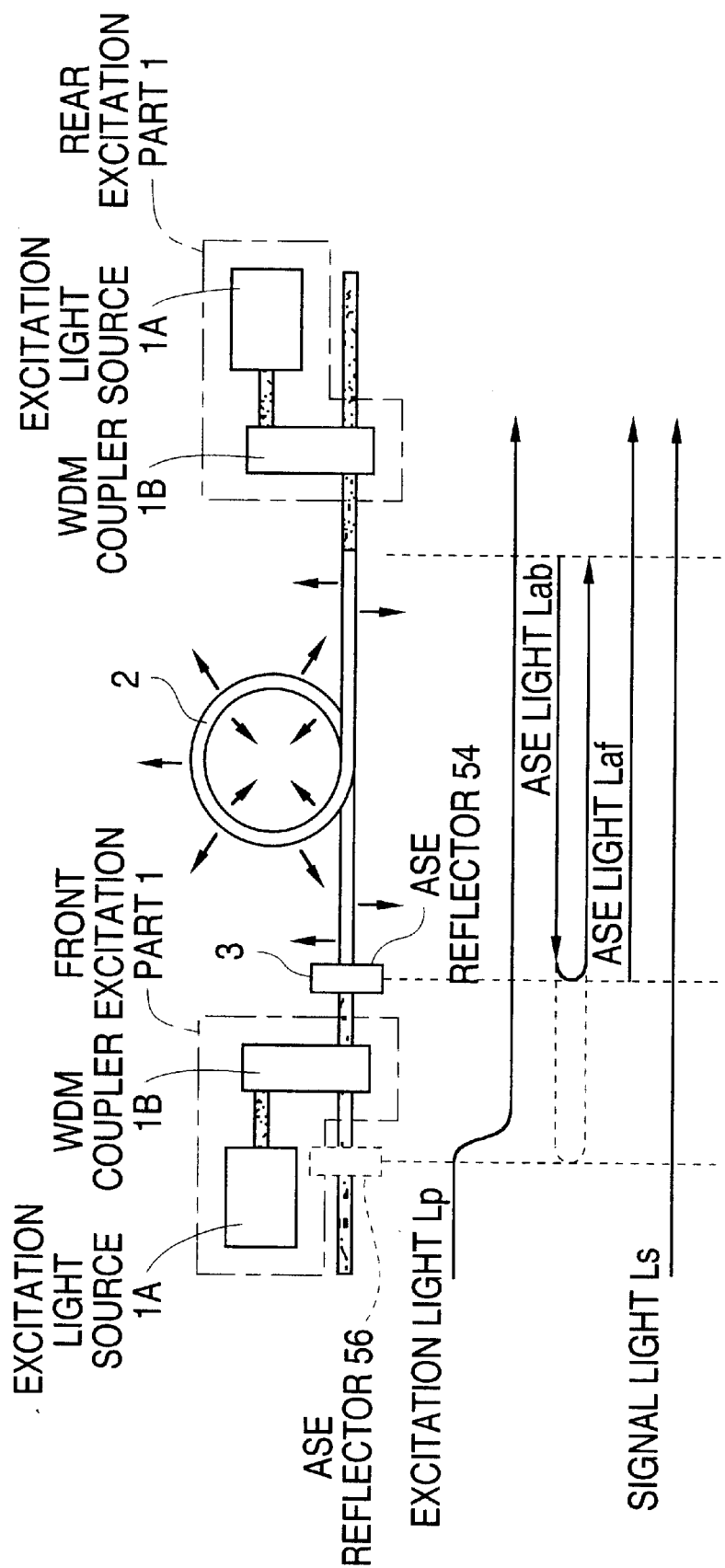

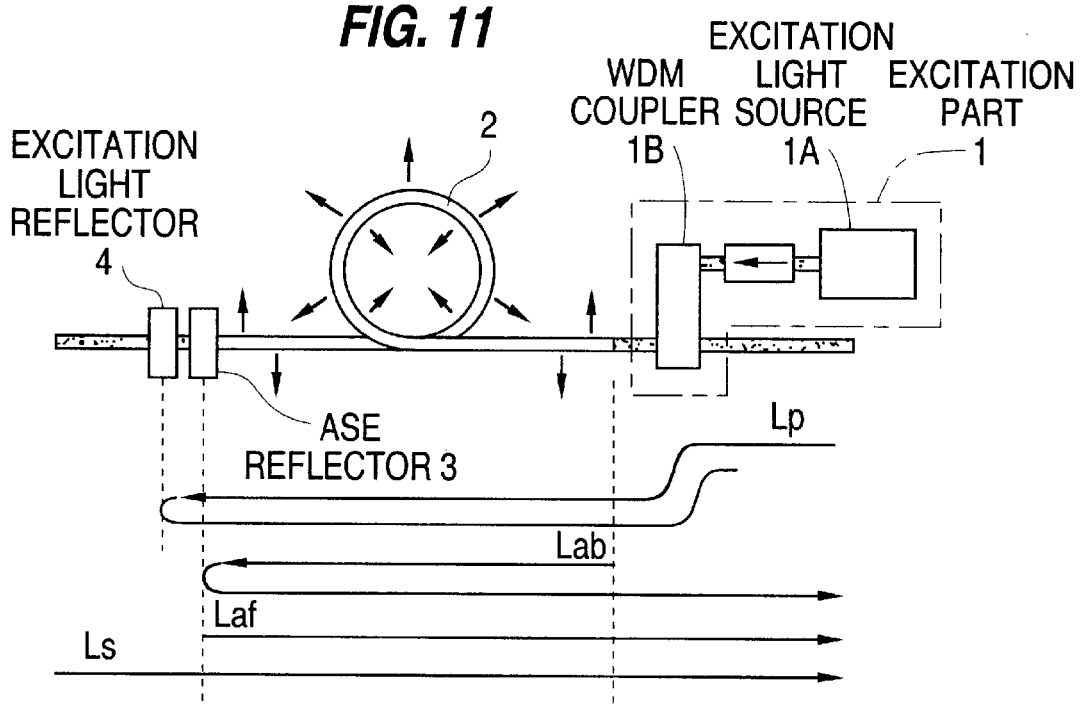
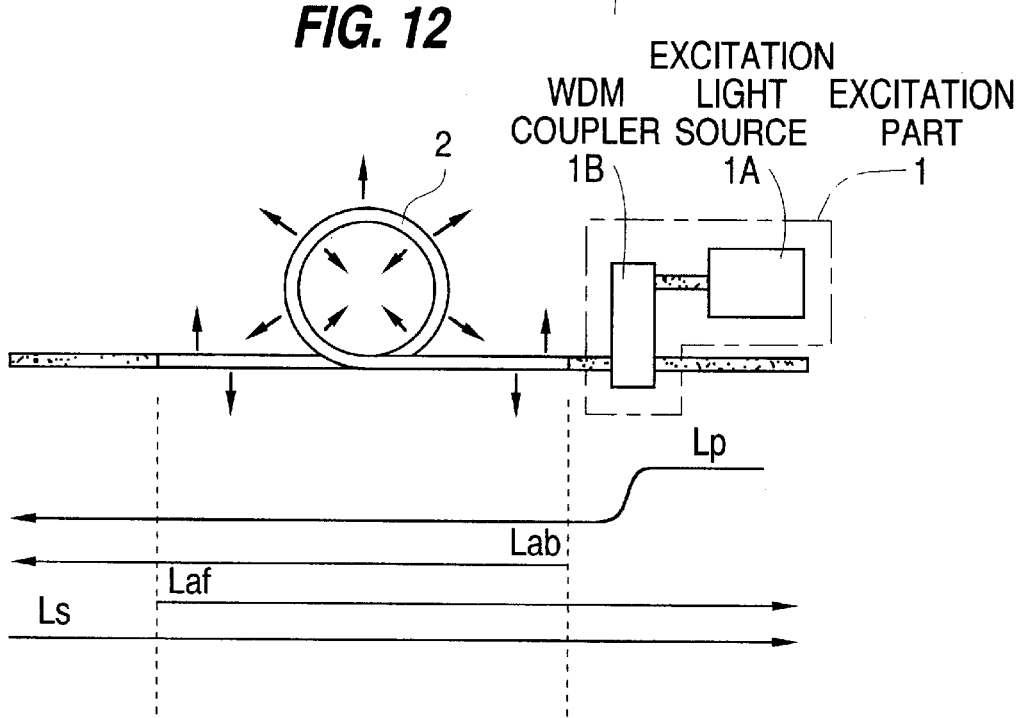

US 6,501,592 B2

OPTICAL AMPLIFIER REFLECTING SPONTANEOUS EMISSION BACK INTO THE AMPLIFIER TO IMPROVE EFFICIENCY

CROSS-REFERENCE TO RELATED APPLICATIONS

This application is based on, and claims priority to, Japanese application number 10-117043, filed Apr. 27, 1998, and which is incorporated herein by reference.

BACKGROUND OF THE INVENTION

1. Field of the Invention

The present invention relates to an optical amplifier which reflects spontaneous emission light back into the optical amplifier to improve excitation efficiency of the optical amplifier.

2. Description of the Related Art

Wavelength division multiplexing (WDM) is being used to increase transmission capacity of optical communication systems. With WDM, a plurality of wavelengths are multiplexed together and transmitted through a single fiber.

Moreover, in an optical communication system employing WDM, an optical amplifier can be used as a repeater. The transmission capacity of the optical communication system can be increased by expanding the gain wavelength band of the optical amplifier, to thereby increase the number of wavelengths which can be multiplexed together.

An Erbium (Er) doped fiber amplifier (EDFA) is a common optical amplifier which is widely used in optical communication systems employing WDM. In a typical EDFA, an excitation wavelength in a 1.48 $\mu$m band or a 0.98 $\mu$m band is used, and gain is obtained in a wavelength band which includes 1.53 $\mu$m to 1.56 $\mu$m (hereinafter referred to as the 1.55 $\mu$m band).

However, with such an EDFA, the gain wavelength band is limited to the 1.55 $\mu$m band. Thus, to realize a WDM optical communication system which can provide much larger capacity as will be required in the future, it is necessary to exploit a new gain wavelength band.

There is a known technique for realizing a gain wavelength band different from the 1.55 $\mu$m band in an EDFA. In this technique, a wavelength band from 1.56 $\mu$m to 1.62 $\mu$m (hereinafter referred to as the 1.58 $\mu$m band) is used. For example, there is reported a technique in which a gain of 25 dB is realized at a wavelength band from 1.57 $\mu$m to 1.61 $\mu$m, while adopting an excitation wavelength in the 1.55 $\mu$m band. See, J. F. Massicott et el., ELECTRONICS LETTERS, Vol. 26, No. 20, pp. 1645–1646,27th September 1990.

Further, it has been lately reported that a gain at a wavelength band from 1.56 $\mu$m to 1.62 $\mu$m can be obtained by utilizing a laser diode of 1.48 $\mu$m band or 0.98 $\mu$m band as an excitation light source. See, H. Ono et el., IEEE PHOTONICS TECHNOLOGY LETTERS, VOL. 9, NO. 5, pp. 596–597, May 1997. This technique is advantageous in that current techniques also use a laser diode excited at the 1.48 $\mu$m or the 0.98 $\mu$m band, and an Erbium doped optical fiber (EDF).

The following is a brief explanation about an operational principle of 1.55 $\mu$m band and 1.58 $\mu$m band EDFAs. As an example of a fiber amplifier doped with rare earth element, there are considered here 1.55 $\mu$m band and 1.58 $\mu$m band EDFAs utilizing an excitation light source of 1.48 $\mu$m band or 0.98 $\mu$m band.

FIGS. 1(A) and 1(B) are diagrams showing energy levels of Erbium atom. As shown in FIG. 1(A), in a conventional 1.55 $\mu$m band EDFA in which the gain is obtained between 1.53 $\mu$m and 1.56 $\mu$m, Erbium atom is excited by an excitation light source of 1.48 $\mu$m band or 0.98 $\mu$m band, and there is caused induced emission between energy levels $^4I^{13/2}$ and $_1I_{15/2}$. By utilizing this induced emission, there is obtained a gain at 1.55 $\mu$m band.

Further, as shown in FIG. 1(B), those energy levels, which are utilized in a 1.58 $\mu$m band EDFA, are also energy levels $^4I_{13/2}$ and $^4I_{15/2}$. For example, in a 1.58 $\mu$m band EDFA, Erbium atom is excited by an excitation light source of 1.48 $\mu$m band or 0.98 $\mu$m band, and 1.55 $\mu$m band spontaneous emission will generate and lead to amplified spontaneous emission (ASE) within a front half part of the fiber. See, H. Ono et al., TECHNICAL REPORT OF IEICE, OCS97-5 (1997–05), pp. 25–30. This 1.55 $\mu$m band ASE is resorbed at a rear half part of the fiber, thereby causing induced emission of 1.58 $\mu$m band. In this 1.58 $\mu$m band EDFA, since the cross sectional area for induced emission at 1.58 $\mu$m band is smaller than that of the 1.55 $\mu$m band EDFA, and since a sufficiently strong 1.55 $\mu$m band ASE is to be generated, it is necessary to provide an EDF of sufficient fiber length.

However, in the aforementioned 1.58 $\mu$m band optical amplifier, it is difficult to confine an excitation light or 1.55 $\mu$m band ASE within the EDF efficiently, thereby resulting in a conversion efficiency which is not high.

The following is an explanation of a state of spontaneous emission which is generated within an EDF of a conventional forward excitation type 1.58 $\mu$m band EDFA.

FIG. 2 is a diagram showing various lights travelling through an EDF, and FIG. 3 is an enlarged view of the EDF in FIG. 2.

As shown in FIGS. 2 and 3, an excitation light source 1A of an excitation part 1 produces excitation light Tp. Excitation light Lp is provided to EDF 2 via a WDM coupler 1B. Erbium atoms within EDF 2 are excited by excitation light Lp, so that spontaneous emission lights are generated. The spontaneous emission light generated from the Erbium atoms is composed of lights advancing in random directions, and only the lights directing into those modes, through which the lights can be propagated within EDF 2, will propagatingly advance within EDF 2. The spontaneous emission lights directing into these propagation modes will be amplified, during propagation through EDF 2 in an excited state, to become 1.55 $\mu$m band ASE, and will be finally emitted from EDF 2.

Since the propagation modes should exist in both of the fore and aft directions, the 1.55 $\mu$m band ASE will be emitted from both ends of EDF 2. On the other hand, those spontaneous emission lights, which do not direct into any propagation modes, will be emitted outwardly from EDF 2 via an outer surface of a cladding. In FIGS. 2 and 3, the 1.55 $\mu$m band ASE in the backward propagation mode is indicated by an ASE light Lab, and the 1.55 $\mu$m band ASE in the forward propagation mode is indicated by an ASE light Laf.

According to the above cited reference H. Ono et al., TECHNICAL REPORT OF IEICE, the 1.55 $\mu$m band ASE, which has been generated at the front half part of EDF 2, is resorbed at the rear half of EDF 2, leading to generation of induced emission (optical amplification) at the 1.58 $\mu$m band. Thus, the amount of ASE in the forward propagation mode, which is outwardly emitted from the output end of the signal light Ls, has a smaller value. However, the amount of ASE in the backward propagation mode, which is emitted outwardly from the input end of the signal light Ls, has a larger value since this mode does not contribute so much to the amplification at the 1.58 µm band. Further, those spontaneous emission lights, which do not direct into any propagation modes, do not contribute to optical amplification at 1.58 µm and are outwardly emitted via outer surface of cladding. As a result, a part of the energy of excitation light Lp supplied from the excitation light source 1A is wastefully consumed, thereby reducing excitation efficiency.

Meanwhile, conventional optical amplifiers aiming at improving excitation efficiency include one described in U.S. Pat. No. 5,138,483, and one described in Japanese Unexamined Patent Publication No. 3-135081. Such optical amplifiers have a configuration as shown in FIG. 4.

Referring now to FIG. 4, the optical amplifier, of which excitation efficiency has been improved, includes an excitation light reflector 4 at a rear side of EDF 2 (i.e., at an outer side of the other end opposite to an input end of excitation light Lp). Excitation light reflector 4 reflects the excitation light Lp and transmits the signal light at 1.55 µm band. Via excitation light reflector 4, the excitation light Lp is reflected to make one reciprocation within EDF 2, thereby improving excitation efficiency.

Unfortunately, in an optical amplifier as illustrated in FIG. 4, only the excitation light Lp (in, for example, the 1.48 µm band or the 0.98 µm) is reflected by excitation light reflector 4. The 1.55 µm band ASE generated within EDF 2 will be transmitted through excitation light reflector 4. Thus, the excitation efficiency will be insufficient if the optical amplifier used to amplify signals in the 1.58 µm band.

SUMMARY OF THE INVENTION

Accordingly, it is an object of the present invention to provide an apparatus in which spontaneous emission light and excitation light are effectively propagated within an active optical fiber to thereby improve excitation efficiency.

Additional objects and advantages of the invention will be set forth in part in the description which follows, and, in part, will be obvious from the description, or may be learned by practice of the invention.

Objects of the present invention are achieved by providing an optical amplifier which includes an active optical fiber doped with a rare earth element. An excitation light generating device generates an excitation light at a predetermined wavelength band and supplies the excitation light to the active optical fiber. A spontaneous emission light reflection device reflects spontaneous emission light generated from the rare earth element excited by the excitation light and having a wavelength band different from that of the excitation light, so that a signal light is amplified as the signal light propagates within the active optical fiber. The signal light is in a wavelength band different from the wavelength band of the excitation light and the wavelength band of the spontaneous emission light.

According to such a configuration, an excitation light (such as at a 1.48 µm band or a 0.98 µm band) is generated by the excitation light generating device, and supplied to the active optical fiber. Within the active optical fiber, there is generated a spontaneous emission light from the rare earth element (such as Erbium) excited by the excitation light. This spontaneous emission light is propagated within the active optical fiber so as to be amplified, and thereby cause amplified spontaneous emission (ASE) at a 1.55 µm band. This 1.55 µm band ASE is resorbed in the course of propagation within the active optical fiber, thereby enabling optical amplification of signal light such as at 1.58 µm band. Further, upon reaching the spontaneous emission light reflection device, the ASE being propagated within the active optical fiber is reflected by the spontaneous emission light reflection device, so as to be propagated in the reverse direction within the active optical fiber. By virtue of this reflection, the possibility of resorption of the spontaneous emission light is increased, so that the amplification of signal light such as at 1.58 µm band can be effected at a higher excitation efficiency.

As ati example, the spontaneous emission light reflection device may include a first reflection part for reflecting the spontaneous emission light and for transmitting the signal light at a signal light input end of the active optical fiber. Further, the spontaneous emission light reflection device may include a second reflection part for reflecting the spontaneous emission light and for transmitting the signal light at a signal light output end of the active optical fiber. In addition, the spontaneous emission light reflection device may have a characteristic to transmit the excitation light, when the spontaneous emission light reflection device is provided between an output end of the excitation light generating device and one end of the active optical fiber into which the excitation light is input.

The spontaneous emission light reflection device can include the first reflection part at the signal light input end, as described above. Thus, the signal light input end of the active optical fiber is rendered to reflect ASE directing into any backward propagation mode which are difficult to be resorbed, among spontaneous emission lights generated within the active optical fiber. As a result, the ASE can be effectively utilized for amplification of the signal light. Further, by providing the second reflection part at the signal light output end of the active optical fiber, the ASE directing into any forward propagation mode is also reflected at the signal light output end, thereby enabling more effective utilization of the ASE.

Preferably, the active optical fiber is provided with, over a predetermined region along the longitudinal direction of the active optical fiber, a spontaneous emission light reflection area having a grating for reflecting the spontaneous emission light and for transmitting the signal light, and the spontaneous emission light reflection area functions as the spontaneous emission light reflection device. Concretely, the spontaneous emission light reflection area may be provided with a first reflection region arranged near a signal light input end of the active optical fiber, or a second reflection region arranged near a signal light output end of the active optical fiber.

According to such an embodiment, the ASE is rendered to be reflected by the spontaneous emission light reflection area formed within the active optical fiber. By providing the spontaneous emission light reflection area in the described manner, loss of signal light at the spontaneous emission light reflection device as well as coupling loss between the spontaneous emission light reflection device and the active optical fiber can be reduced or eliminated. Thus, the excitation efficiency is further enhanced, while enabling reduction of the noise factor.

An excitation light reflection device can also be provided at another end opposite to the one end of the active optical fiber into which the excitation light is input, for reflecting the excitation light and for transmitting the signal light.

By such an embodiment, the excitation light propagating within the active optical fiber is reflected by the excitation light reflection device, so as to go and return within the active optical fiber. As such, the excitation efficiency of the excitation light is enhanced, thereby enabling further high-powerization of the optical amplifier.

Preferably, the active optical fiber is provided with an excitation light reflection area near another end opposite to the one end of the active optical fiber into which one end the excitation light is input. The excitation light reflection area can then have a grating for reflecting the excitation light and for transmitting the signal light. As a result, the excitation light reflection area functions as the excitation light reflection device.

Thus, the excitation light is rendered to be reflected by the excitation light reflection area within the active optical fiber, so that insertion and coupling losses due to excitation light reflection device can be reduced or eliminated, thereby enabling further high-powerization of, and noise factor reduction in, the optical amplifier.

Further, with respect to the apparatus provided with the excitation light reflection device, the excitation light generating device is advantageously provided with an excitation light entrance prevention part for preventing the reflected excitation light from entering the excitation light generating device. The excitation light entrance prevention part can be an optical isolator which transmits the generated excitation light only in one direction, or an optical circulator which transmits the generated excitation light only in a certain direction between a plurality of terminals.

By providing the excitation light generating device with the excitation light entrance prevention part, there can be avoided such a situation that the operation of excitation light generating device becomes unstable due to entrance of the reflected excitation light.

In addition, with respect to any one of the aforementioned apparatuses, the active optical fiber is preferably provided with, at a surface of cladding thereof, a spontaneous emission light reflection layer for reflecting the spontaneous emission light.

By adopting such an active optical fiber, there are also confined within the active optical fiber those lights which do not direct to any propagation modes, among spontaneous emission lights generated within the active optical fiber. Thus, the excitation efficiency can be further enhanced.

The present invention further provides an active optical fiber doped with a rare earth element, including a spontaneous emission light reflection area arranged over a predetermined region along a longitudinal direction of the active optical fiber. A grating is included in the spontaneous emission light reflection area. The grating reflects the spontaneous emission light generated from the rare earth element excited by an excitation light and having a wavelength band different from that of the excitation light, and transmits a signal light at a wavelength band different from the wavelength band of the excitation light and different from the wavelength band of the spontaneous emission light.

According to such an active optical fiber, ASE directing into any propagation modes, among the spontaneous emission lights generated within the active optical fiber, can be reflected just within the active optical fiber. Thus, optical amplification at a higher excitation efficiency can be realized.

Preferably, the active optical fiber further includes, at a surface of cladding of the active optical fiber, a spontaneous emission light reflection layer for reflecting the spontaneous emission light. Thus, it becomes possible to confine ASE directing into any non-propagation modes, within the active optical fiber.

Further, an optical amplifying method is provided and which includes (a) generating an excitation light at a predetermined wavelength band; (b) supplying the excitation light to an active optical fiber doped with a rare earth element; (c) reflecting a spontaneous emission light generated from the rare earth element excited by the excitation light and having a wavelength band different from that of the excitation light, and (d) propagating, within the active optical fiber, a signal light at a wavelength band different from the wavelength band of the excitation light and different from the wavelength band of the spontaneous emission light, such that the signal light is amplified within the active optical fiber.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 7 is a diagram illustrating an optical amplifier, according to an embodiment of the present invention.

FIG. 8 is a diagram illustrating an optical amplifier, according to an embodiment of the present invention.

FIG. 9 is a diagram illustrating an optical amplifier, according to an embodiment of the present invention.

FIG. 10 is a diagram illustrating an optical amplifier, according to an embodiment of the present invention.

FIG. 11 is a diagram illustrating an optical amplifier, according to an embodiment of the present invention.

FIG. 12 is a diagram illustrating an optical amplifier, according to an embodiment of the present invention.

DETAILED DESCRIPTION OF THE INVENTION

Figure 1A:
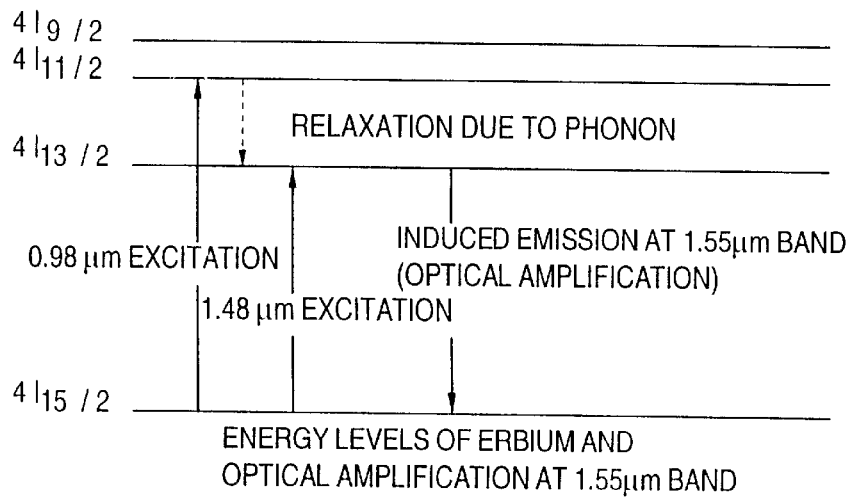
FIGS. 1(A) and 1(B) (prior art) are diagrams illustrating energy levels of Erbium atom.
Figure 1B:
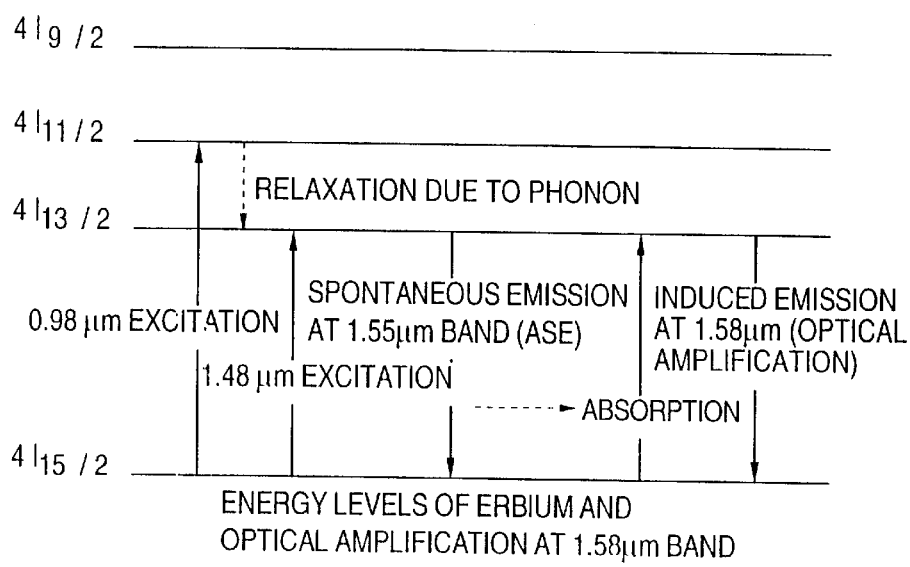

Reference will now be made in detail to the present preferred embodiments of the present invention, examples of which are illustrated in the accompanying drawings, wherein like reference numerals refer to like elements throughout.

Figure 2:
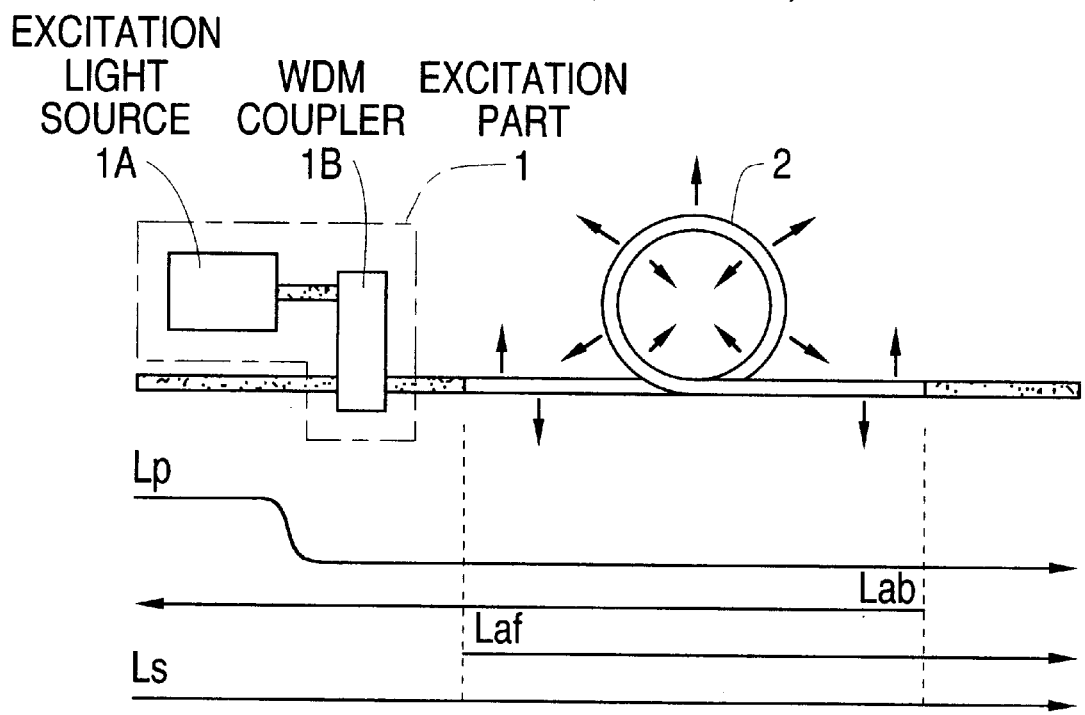
FIG. 2 (prior art) is a diagram illustrating a 1.58 $\mu$m band optical amplifier of forward excitation type, and a state of spontaneous emission lights generated within an EDF of the optical amplifier.
Figure 5:
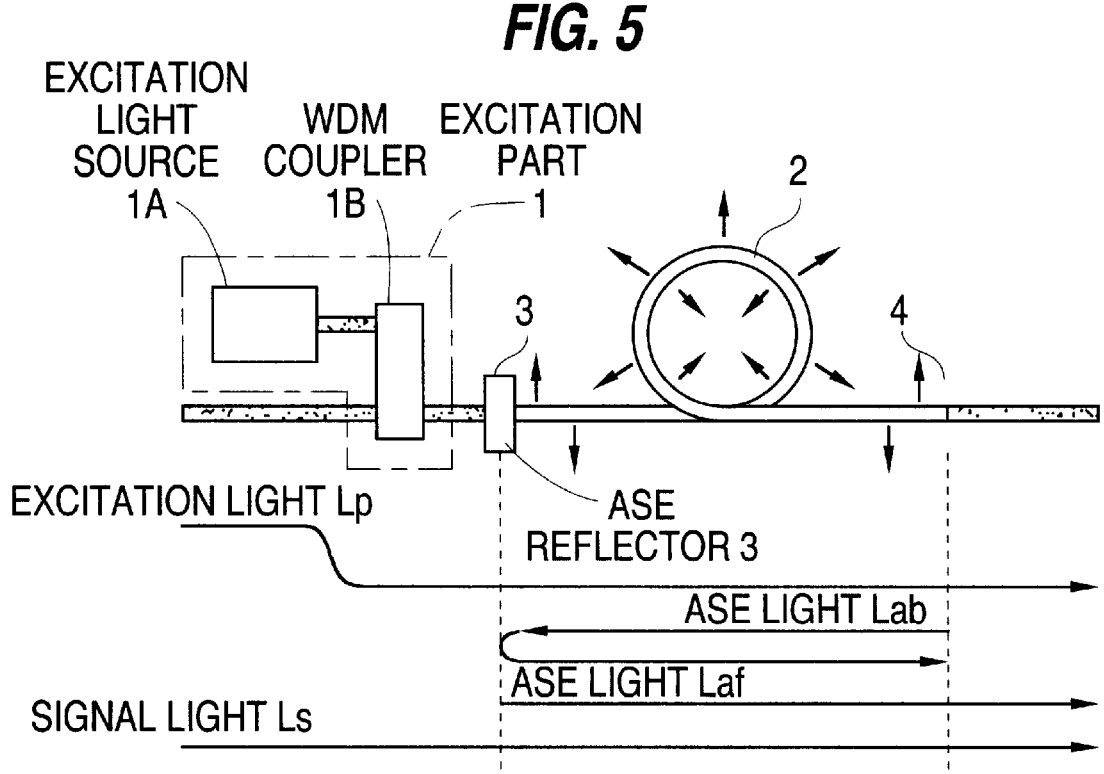
FIG. 5 is a diagram illustrating an optical amplifier, according to an embodiment of the present invention.

FIG. 5 is a diagram illustrating of an optical amplifier, according to an embodiment of the present invention. Referring now to FIG. 5, an excitation part 1 is an excitation light generating device for generating an excitation light Lp. An Erbium doped optical fiber (EDF) 2 is an active optical fiber which receives excitation light Lp and a signal light Ls from one end thereof. A 1.55 µm band ASE reflector 3 is a first reflection part of a spontaneous emission light reflection device which is interposed between excitation part 1 and one end of EDF 2. Thus, the optical amplifier in FIG. 5 is differentiated from the one shown in FIG. 2, in that the former is provided with 1.55 µm band ASE reflector 3 at the signal light input side of EDF 2.

Excitation part 1 includes an excitation light source 1A and wavelength division multiplexing (WDM) coupler 1B. Excitation light source 1A generates excitation light Lp having a wavelength, for example, in a 1.48 µm band or a 0.98 µm band, and sends it to WDM coupler 1B. WDM coupler 1B has input ports which receive excitation light Lp, and signal light Ls in a 1.58 µm band. WDM coupler 1B multiplexes the received excitation light Lp and signal light Ls, and outputs the multiplexed lights from an output port.

EDF 2 is a commonly used doped optical fiber, the core part of which is doped with rare earth element, such as Erbium. In this example, an EDF is used, but it is possible to use an optical fiber doped with a rare earth element other than Erbium.

1.55 µm band ASE reflector 3 has characteristics so that it reflects the 1.55 µm band ASE generated within EDF 2, and transmits signal light Ls and excitation light Lp. Such reflectors may include, for example, a WDM coupler having a reflective body in one port or a grating filter. However, other devices can be used as a reflector.

Figure 4:
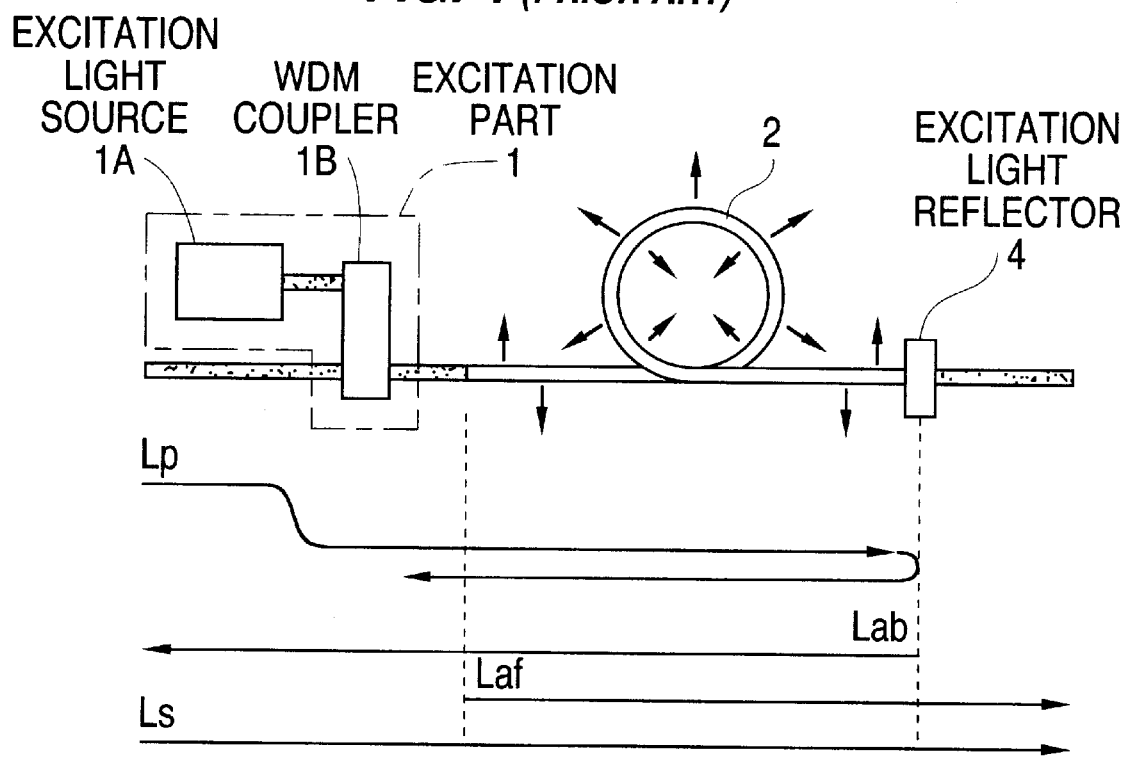
FIG. 4 (prior art) is a diagram illustrating an optical fiber amplifier provided with an excitation light reflector.

There will be now be compared an optical amplifier provided with the excitation light reflector shown in FIG. 4, with that of the optical amplifier in FIG. 5.

The optical amplifier in FIG. 5 is differentiated from that in FIG. 4 in that the optical amplifier in FIG. 4 is provided with excitation light reflector 4 for reflecting the excitation light Lp emitted from excitation light source IA. By contrast, the optical amplifier in FIG. 5 is provided with 1.55 µm band ASE reflector 3 for reflecting the 1.55 µm band ASE generated within EDF 2. Further, considering a case of forward excitation, the effect of excitation light reflector 4 of the optical amplifier in FIG. 4 is obtained when reflector 4 is arranged at a signal light output end of EDF. Contrary to this, the 1.55 µm band ASE reflector 3 of the optical amplifier in FIG. 5 is more effective when reflector 3 is arranged at a signal light input end of EDF, since the amount of 1.55 µm band ASE in the backward propagation mode is larger than that of 1.55 µm band ASE in the forward propagation mode.

As explained above, in the optical amplifier in FIG. 5, upon generation of excitation light Lp at excitation light source 1A, this excitation light Lp is sent to 1.55 µm band ASE reflector 3 via WDM coupler 1B, and transmits through 1.55 µm band ASE reflector 3, so as to be input into one end of EDF 2.

The excitation light Lp input into EDF 2 is propagated within EDF 2 while causing Erbium atoms to be excited, and is finally output from the other end of EDF 2. The excited Erbium atoms generate spontaneous emission lights. Among these spontaneous emission lights, those lights directing into the propagation modes will be propagated within the EDF being in an excited state, and will be thereby amplified to lead to 1.55 µm band ASE. This 1.55 µm band ASE includes those directing into the backward propagation modes (propagating into the leftward direction in the figures), and those directing into the forward propagation modes (propagating into the rightward direction in the figures). The 1.55 µm band ASE directing into the backward propagation modes is denoted by ASE lights Lab whereas the 1.55 µm band ASE directing into the forward propagation modes is denoted by ASE lights Laf.

The ASE lights Laf directing into any forward propagation mode are resorbed at the rear half part of EDF 2, to thereby cause induced emission (optical amplification) at 1.58 µm band. Thus, the ASE lights Laf are emitted from the other end (signal light output end) of EDF 2, in a small amount only. Meanwhile, the amount of resorption of ASE lights Lab directing into any backward propagation mode is small, so that most of them will reach one end (signal light input end) of EDF 2 and then be reflected by 1.55 µm band ASE reflector 3. As a result, the ASE lights Lab firstly directing into any backward propagation mode are reflectedly propagated toward the signal light output end, and resorbed in the course of such propagation. Thus, the ASE lights Lab directing into backward propagation modes, which were not effectively utilized in the optical amplifier in FIG. 4, can be effectively utilized for optical amplification at 1.58 µm band.

In FIG. 5, upon input of the signal light Ls in 1.58 µm band via WDM coupler 1B into one end of EDF 2 which has been put into an excited state in the manner noted above, signal light Ls is amplified during propagation through EDF 2, and finally output from the other end of EDF 2.

According to the above embodiment of the present invention, by providing 1.55 µm band ASE reflector 3 at the signal light input end of EDF 2, the ASE lights Lab directing into any backward propagation mode are effectively utilized for optical amplification at 1.58 µm band, so that the excitation efficiency of the optical amplifier can be improved.

Figure 6:
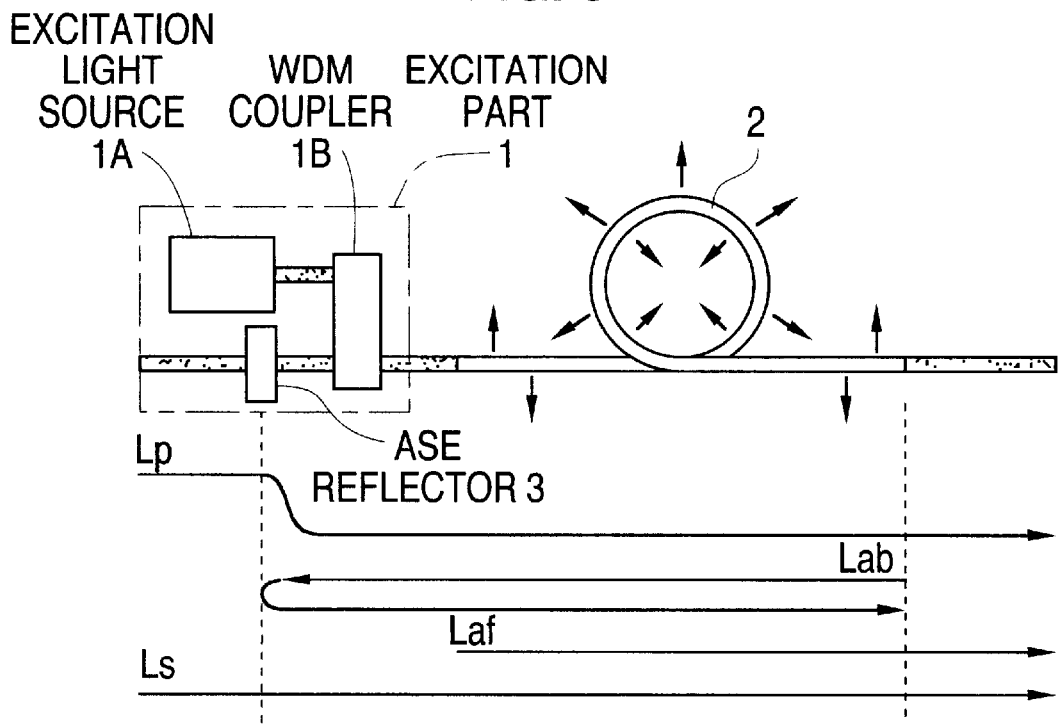
FIG. 6 is a diagram illustrating an optical amplifier, according to an embodiment of the present invention.

In the above embodiment of the present invention, 1.55 µm band ASE reflector 3 is arranged between WDM coupler 1B and EDF 2. However, 1.55 µm band ASE reflector 3 may be arranged at a pre-stage of a port of WDM coupler 1B into which signal light Ls is input, such as shown in FIG. 6. In this case, 1.55 µm band ASE reflector 3 does not need to have a characteristic of transmitting the excitation light Lp. This will be explained in more detail below.

FIG. 7 is a diagram illustrating an optical amplifier, according to an additional embodiment of the present invention. Referring now to FIG. 7, the optical amplifier is provided with, at the other end of EDF 2, another 1.55 µm band ASE reflector 3' as a second reflection part of the spontaneous emission light reflection device.

1.55 µm band ASE reflector 3' is preferably constituted in a manner identical to 1.55 µm band ASE reflector 3, so that the former has such characteristics to reflect the 1.55 µm band ASE and transmit the signal light Ls.

In such an optical amplifier, the ASE lights Laf directing into any forward propagation mode, which have reached the signal light output end of EDF 2, are reflected by 1.55 μm band ASE reflector 3'. These reflected ASE lights Laf will thereby be propagated toward the signal light input end through the interior of EDF 2, so that these ASE lights Laf are resorbed in the course of such propagation. As a result, both of the ASE lights Lab and ASE lights Laf directing into any backward propagation modes and forward propagation modes, respectively, can be effectively utilized for optical amplification at 1.58 μm band, so that the excitation efficiency of optical amplifier can be further improved.

FIG. 8 is a diagram illustrating an optical amplifier, according to a further embodiment of the present invention. The optical amplifier in FIG. 8 is a backward excitation type optical amplifier. Referring now to FIG. 8, 1.55 μm band ASE reflector 3 is arranged at the signal light input end of EDF 2, while excitation part 1 is arranged at the signal light output end of EDF 2. The constitutions of excitation part 1, EDF 2 and 1.55 μm band ASE reflector 3 are identical to those in FIGS. 5 and 6, and only the position of excitation part 1 has been modified.

In such a backward excitation type of optical amplifier, although only the excitation light Lp is propagated from the signal light output end toward the signal light input end of EDF 2, the remaining functions and effects are identical to those in FIGS. 5 and 6 for forward excitation.

In FIG. 8, 1.55 μm band ASE reflector 3 is provided at the signal light input end of EDF 2, so as to reflect the ASE lights Lab directing into any backward propagation mode. However, it is of course possible to provide another 1.55 μm band ASE reflector at the signal light output end, similarly to that in FIG. 7. Concretely, as shown in FIG. 9, there can be provided another 1.55 μm band ASE reflector 3', between the signal light output end of EDF 2 and WDM coupler 1B (solid line 50), or at a post-stage of a port of WDM coupler 1B from which the signal light Ls is output (dotted line 52).

The present invention is not limited to either of forward excitation or backward excitation, and can be applied to an optical amplifier of a bi-directional excitation type as shown in FIG. 10. Also, in bidirectional excitation, 1.55 μm band ASE reflector 3 can be provided between WDM coupler 1B of the front excitation part 1 and one end of EDF 2 (solid line 54), or at a pre-stage of a port of WDM coupler 1B of front excitation part 1 into which the signal light is input (dotted line 56). Further, it is also possible, although not shown, to provide a 1.55 μm band ASE reflector between WDM coupler 1B of the rear excitation part 1 and the other end of EDF 2, or at a post-stage of a port of WDM coupler 1B of the rear excitation part 1 from which the signal light is output.

FIG. 11 is a diagram illustrating an optical amplifier, according to an additional embodiment of the present invention. In FIG. 11, the conversion efficiency of excitation light is improved by providing an excitation light reflector similar to that shown in FIG. 4, with respect to an optical amplifier of a backward excitation type as shown in FIG. 8.

More specifically, referring now to FIG. 11, 1.55 μm band ASE reflector 3 and an excitation light reflector 4 are serially arranged at the signal light input end of EDF 2. Of course, the serial order of 1.55 μm band ASE reflector 3 and excitation light reflector 4 can be reversed. An optical isolator 1C is provided within excitation part 1.

Excitation light reflector 4 has such characteristics to reflect the excitation light Lp generated at excitation light source 1A, and to transmit the signal light Ls. Excitation light reflector 4 can be embodied, for example, by a WDM coupler having a reflective body in one port, or a grating filter (see, H. Ono et al., TECHNICAL REPORT OF IEICE, OCS97-5(1997-05), pp. 25–30; or C. R. Giles et al., Tech. Dig. OAA '91, 1991, Paper ThD2). Further, excitation light reflector 4 is arranged at a pre-stage of 1.55 μm band ASE reflector 3 (i.e., at an input side of signal light Ls). However, excitation light reflector 4 may be arranged at a post-stage of 1.55 μm band ASE reflector 3, i.e., between 1.55 μm band ASE reflector 3 and one end of EDF 2.

Optical isolator 1C is arranged, for example, between excitation light source 1A and WDM coupler 1B, so as to transmit the light from excitation light source 1A in the direction to WDM coupler 1B only, and block the transmission of the light in the reverse direction.

There will be briefly explained hereinafter why a device such as optical isolator IC is preferably used when excitation light reflector 4 is provided in the optical amplifier.

FIG. 12 is a diagram illustrating an optical amplifier having an excitation light source, and not including an excitation light reflector.

Generally, for example, in a Distributed Feed-Back (DFB) type laser diode which is capable of oscillating in a single mode and is therefore used as a signal light source, there may be an unstable operation, such as fluctuation of wavelength and output power. Such unstable operation may be due, for example, to simply a subtle amount of returning reflected light. Thus, it is preferable that a device such as an optical isolator be provided within the laser module, thereby preventing the reflected light from returning to the light source.

Contrary to the above, a Fabry-Perot type laser diode is typically adopted as an excitation light source of an optical amplifier. Thus, in the optical amplifier having a configuration shown in FIG. 12, since the amount of returning reflected light is small and since the fluctuation (unstable operation) due to a subtle amount of returning reflected light, if any, is negligible, it is unnecessary to use an optical isolator.

Figure 13:
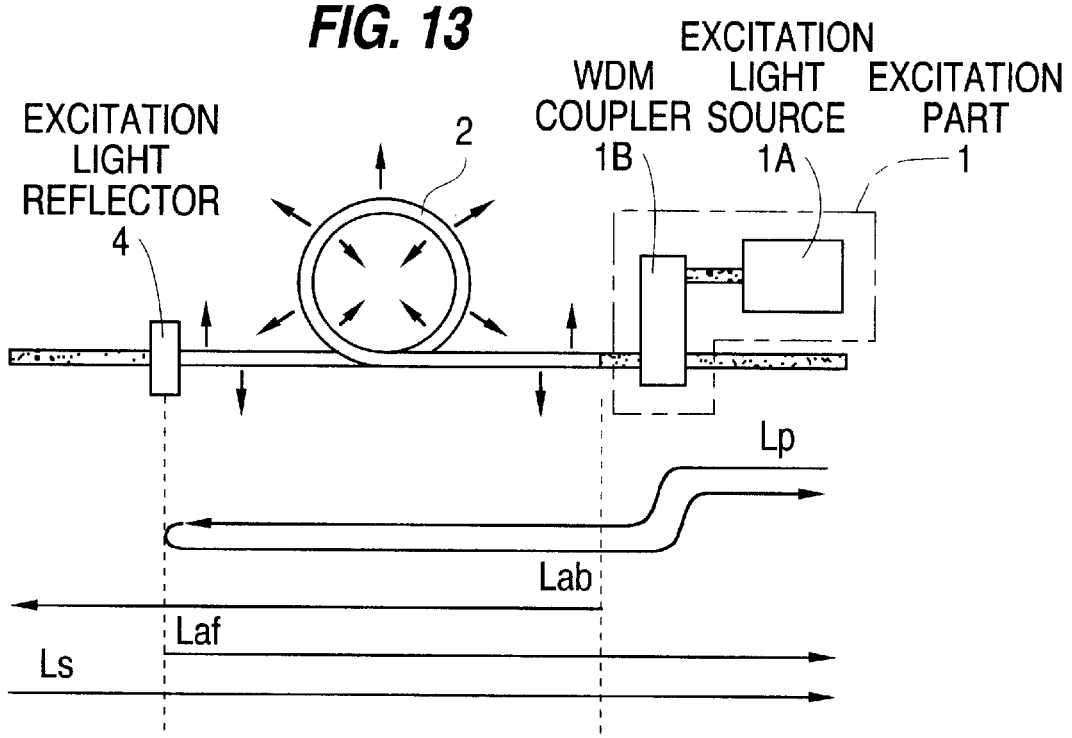
FIG. 13 is a diagram illustrating an optical amplifier, according to an embodiment of the present invention.

There is further considered about a case that excitation light reflector 4 is provided in such a manner as shown in FIG. 13. In this case, after exiting excitation light source 1A, the excitation light Lp is provided to EDF 2 by WDM coupler 1B, is reflected by excitation light reflector 4, and again passes through WDM coupler 1B to thereby return to excitation light source 1A. Since the amount of returning reflected light is large in this case, the unstable operation due to returning light can not be neglected even when a Fabry-Perot type laser diode is adopted as excitation light source 1A. Thus, it becomes necessary to take measures to prevent the excitation light Lp from returning to excitation light source 1A.

Figure 14:
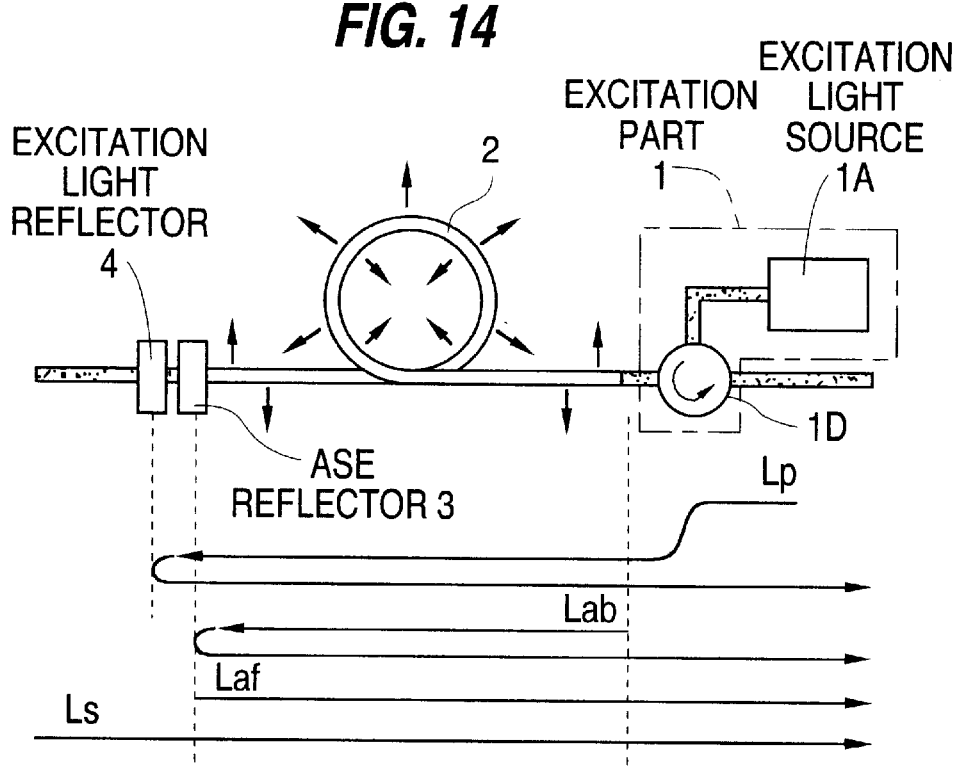
FIG. 14 is a diagram illustrating an optical amplifier, according to an embodiment of the present invention.

Therefore, in FIG. 11, optical isolator 1C is provided in excitation part 1, to thereby prevent the excitation light Lp reflected by excitation light reflector 4 from entering excitation light source 1A. Other than optical isolator 1C, it is possible to prevent the excitation light Lp from entering excitation light source 1A by adopting, for example, an optical circulator 1D in place of WDM coupler 1B, as shown in FIG. 14. Optical circulator 1D has a characteristic to transmit a light only in the direction indicated by an arrow in the figure.

In FIG. 14, the ASE lights Lab directing into any backward propagation mode is reflected by 1.55 μm band ASE reflector 3 and the excitation light Lp is reflected by excitation light reflector 4, so that both of the ASE lights Lab and the excitation light Lp travel through and return within EDF 2, thereby further improving an excitation efficiency of the optical amplifier. Further, since excitation part 1 includes optical isolator 1C, it is possible to stably operate excitation light source 1A.

In FIG. 11, optical isolator 1C is arranged between excitation light source 1A and WDM coupler 1B. However, the inserting position of optical isolator 1C is not limited thereto. For example, optical isolator 1C may be built in excitation light source 1A. Further, although a backward excitation type has been explained, the 1.55 μm band ASE reflector and the excitation light reflector may be also provided with forward excitation. In this case, the excitation light reflector should be arranged at the side of the signal light output end of EDF 2.

Figure 15:
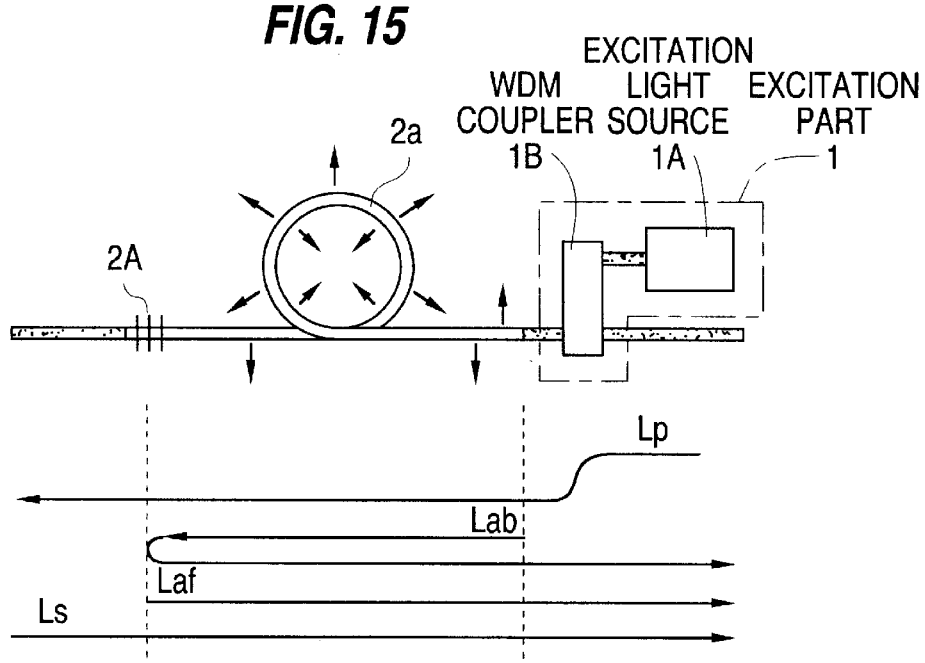
FIG. 15 is a diagram illustrating an optical amplifier, according to an embodiment of the present invention.

FIG. 15 is a diagram illustrating an optical amplifier according to a further embodiment of the present invention. In FIG. 15, the optical amplifier uses backward excitation, and the 1.55 μm band ASE is reflected by providing gratings within EDF 2.

Referring now to FIG. 15, an EDF 2a is applied with, near its signal light input end, gratings 2A for reflecting 1.55 μm band ASE. Gratings 2A provide EDF 2a with the function of the 1.55 μm band ASE reflector coupled to the signal light input end of EDF 2 in FIG. 8. The remaining configuration in FIG. 15 is the same as that in FIG. 8.

In FIG. 15, each grating 2A is prepared, for example, by irradiating ultraviolet rays to a core within EDF 2 from the outside, to thereby provide the core with a periodical variation of refractive index. This periodical variation of refractive index results in a filtering characteristic. Gratings 2A have characteristics to reflect a light at 1.55 μm band and to transmit those lights having other wavelengths.

Figure 16:
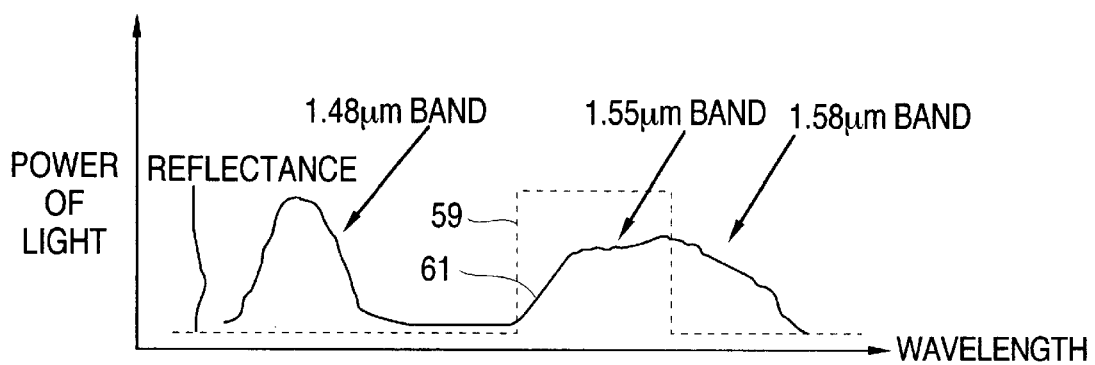
FIG. 16 is a diagram illustrating reflectance of gratings in an optical amplifier, according to an embodiment of the present invention.

FIG. 16 is a diagram indicating reflectance of gratings 2A (dotted line 59) in relation to a wavelength spectrum (solid line 61) of lights being propagated within EDF 2, according to an embodiment of the present invention. As shown in FIG. 16, the 1.55 μm band ASE is reflected by gratings 2A, and the excitation light Lp at 1.48 μm band and the signal light Ls at 1.58 μm band pass through gratings 2A.

With the optical amplifier in FIG. 15, ASE lights Lab of the 1.55 μm band ASE generated within EDF 2, which direct to any backward propagation mode, are reflected by gratings 2A so as to be effectively utilized for optical amplification at 1.58 μm band, in a manner similar to that in FIG. 8. In addition, loss of signal light Ls is smaller in the optical amplifier of FIG. 15, as compared to the optical amplifier in FIG. 8.

The following is an explanation of why the loss of signal light Ls is made smaller in the optical amplifier of FIG. 15.

In the optical amplifier of FIG. 8, when 1.55 μm band ASE reflector 3 is coupled to the signal light input end of EDF 2, this 1.55 μm band ASE reflector 3 inevitably causes loss of the signal light Ls. This is because the reflector itself causes loss onto signal light wavelength, and coupling loss is also caused due to coupling between EDF 2 and reflector 3 (see C. R. Giles et al., Tech. Dig. OAA '91, 1991, Paper ThD2). Particularly, when 1.55 μm band ASE reflector 3 is arranged at the signal light input end in case of backward excitation, the input end loss of signal light Ls is increased, resulting in increase (deterioration) of a noise factor of optical amplifier.

In consideration of the above, in the optical amplifier in FIG. 15, if gratings 2A are provided within EDF 2 so as to reflect the ASE light Lab, no coupling portions between EDF 2 and reflector exist, so that coupling loss can be eliminated. Further, gratings 2A are applied within the optical fiber doped, preferable, with Erbium, so that a gain to some extent can be expected also at the grating part. Thus, the loss of signal light Ls which is due to reflection of ASE light can be substantially eliminated.

According to an optical amplifier as in FIG. 15, the 1.55 μm band ASE can be effectively utilized and the loss of signal light Ls can be reduced by adopting EDF 2a, so that the improvement of excitation efficiency and reduction of noise factor can be realized.

According to an optical amplifier as in FIG. 15, only the signal light input end of EDF is applied with gratings 2A. However, it is possible to additionally reflect the ASE lights Laf directing into any forward propagation mode, by adopting an EDF 2b applied with, at its signal light output end, additional gratings 2B for reflecting the 1.55 μm band ASE. Further, although FIG. 15 shows backward excitation, the embodiments of the present invention are also applicable in the same manner to forward excitation and bidirectional excitation.

Figure 17:
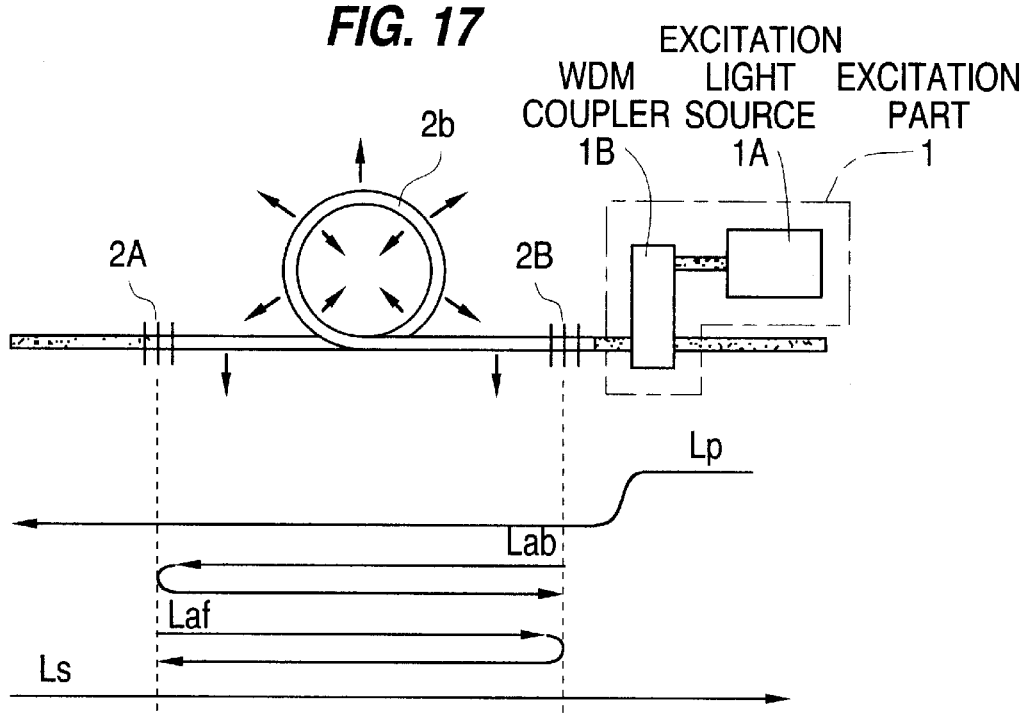
FIG. 17 is a diagram illustrating an optical amplifier, according to an embodiment of the present invention.

FIG. 17 is a diagram illustrating an optical amplifier according to a still further embodiment of the present invention. In FIG. 17, EDF 2b is provided with gratings for reflecting excitation light Lp.

Figure 18:
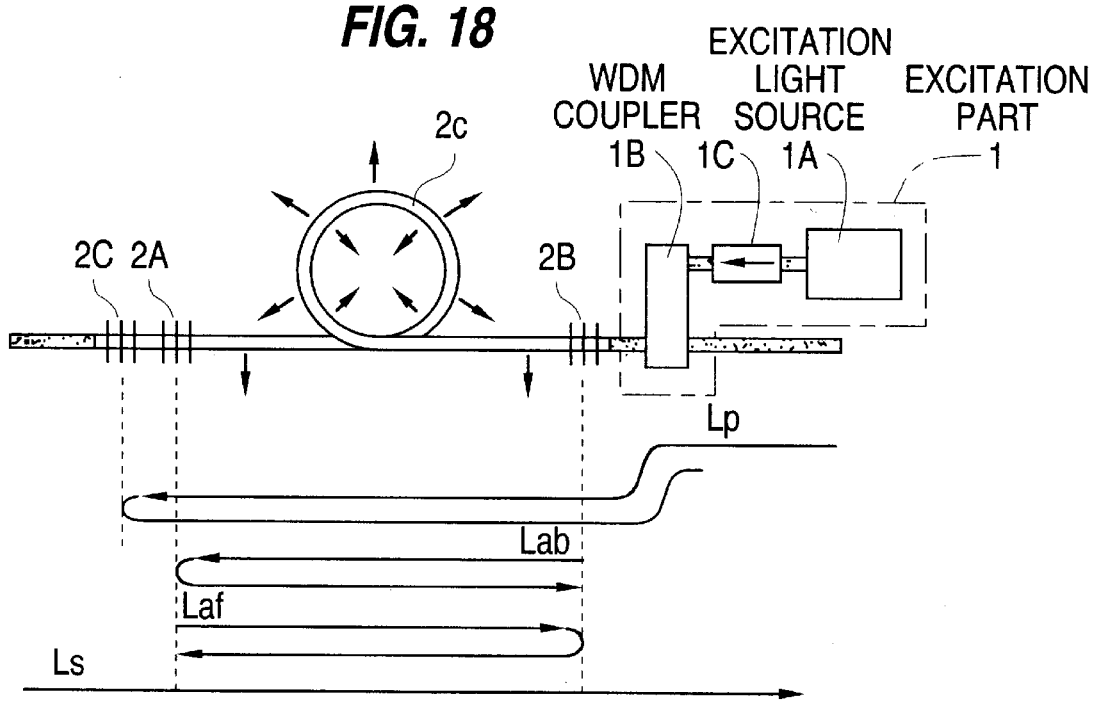
FIG. 18 is a diagram illustrating an optical amplifier, according to an embodiment of the present invention.

FIG. 18 is a diagram illustrating an optical amplifier according to an additional embodiment of the present invention. In FIG. 18, an EDF 2c is applied with, near its signal light input end, gratings 2C for reflecting the excitation light Lp, in addition to gratings 2A and 2B applied near the respective ends of EDF 2c so as to reflect the 1.55 μm band ASE.

Gratings 2C have such characteristics to reflect those lights corresponding to the wavelength band of excitation light Lp and to transmit lights at other wavelengths. These gratings 2C are preferably arranged closer to the signal light input end than gratings 2A. According to such an arrangement, Erbium located at the portion of gratings 2A is also supplied with the excitation light Lp, thereby enabling excitation of Erbium over a wider region of the fiber.

Figure 19A:
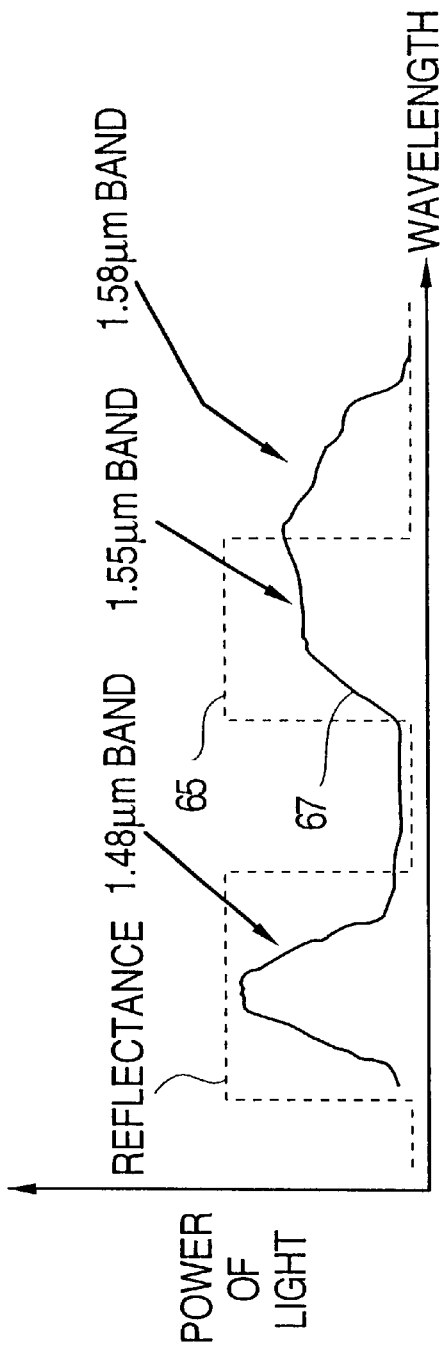
FIGS. 19(A) and 19(B) are diagrams illustrating reflectance of gratings at a signal light input side of an optical amplifier, according to an embodiment of the present invention.
Figure 19B:
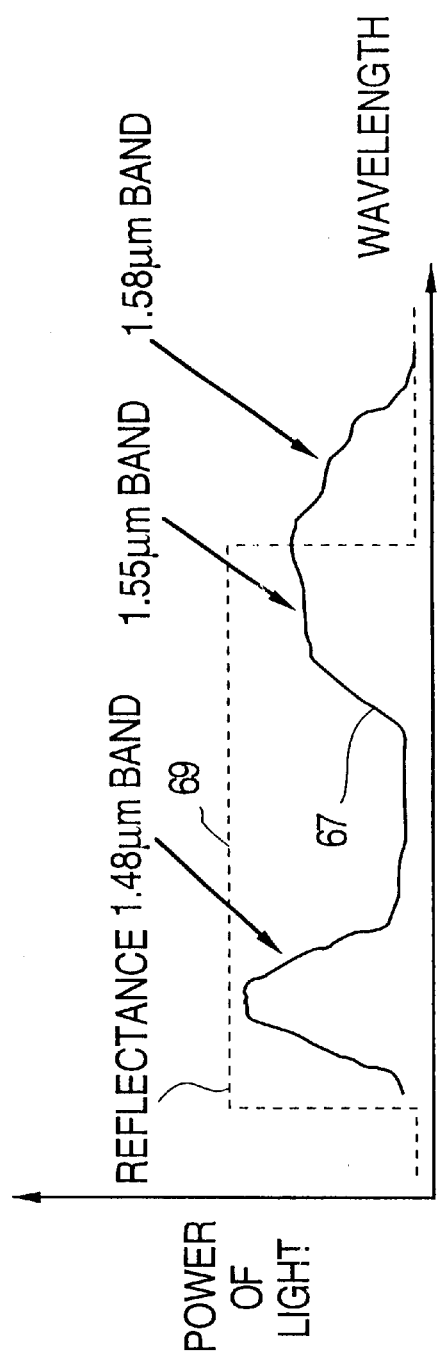

FIGS. 19(A) and 19(B) are graphs illustrating the reflectance of gratings, according to an embodiment of the present invention.

More specifically, FIG. 19(A) is a graph indicating reflectance of gratings 2A and 2C (dotted line 65) at the signal light input side in relation to a wavelength spectrum (solid line 67) of lights being propagated within EDF 2. As shown in this figure, in the signal light input side, the excitation light Lp at 1.48 μm band and the 1.55 μm band ASE are reflected by gratings 2C and 2A, respectively, and the signal light Ls at 1.58 μm band passes through gratings 2C and 2A. Meanwhile, the reflection bands of gratings 2A and 2C may overlap with each other, as indicated by a dotted line 69 in FIG. 19(B).

In an optical amplifier having such a constitution, the ASE lights Lab directing into any backward propagation mode and the ASE lights Laf directing into any forward propagation mode, both generated within EDF 2, are reflected by gratings 2A and 2B, respectively. The backwardly supplied excitation light Lp is reflected by gratings 2C. Therefore, both of the 1.55 μm band ASE and the excitation light are utilized effectively. Further, in an embodiment using gratings, insertion loss and coupling loss due to reflectors are eliminated, as compared to a case that a 1.55 μm band ASE reflector and/or an excitation light reflector are externally coupled to the EDF. Thus, in an optical amplifier according to embodiments of the present invention, the excitation efficiency in the optical amplifier is further improved, and the noise factor is also reduced.

Moreover, according to embodiments of the present invention, as discussed in more detail below, those ASEs directing into any non-propagation modes can be confined within the EDF, so as to further improve the excitation efficiency.

Figure 20:
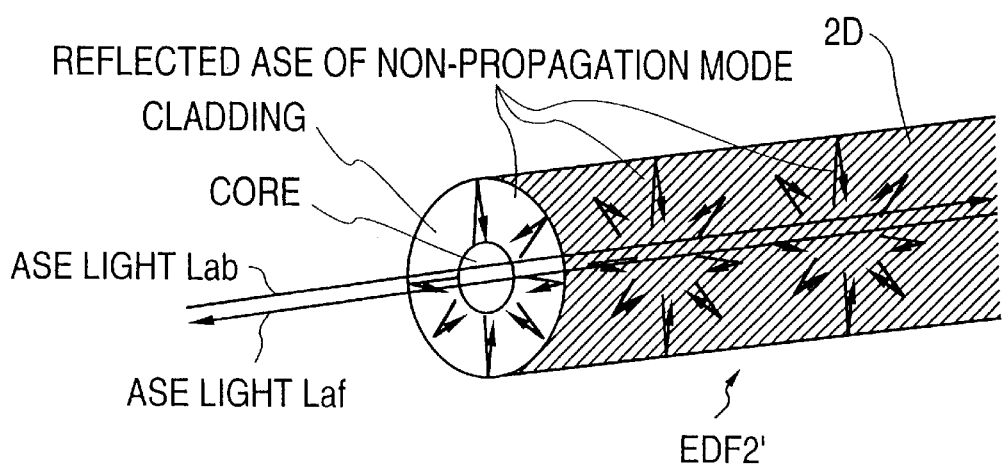
FIG. 20 is a diagram illustrating an enlarged partial sectional view of an EDF to be utilized in an optical amplifier, according to an embodiment of the present invention.

For example, FIG. 20 is a diagram illustrating an enlarged partial sectional view of an EDF for use in an optical amplifier, according to embodiments of the present invention. Referring now to FIG. 20, in EDF 2', a cladding surface is applied with a 1.55 $\mu$m band ASE reflective coating 2D as a spontaneous emission light reflection layer. The material for ASE reflective coating 2D includes, for example, gold, copper, and aluminum.

Figure 3:
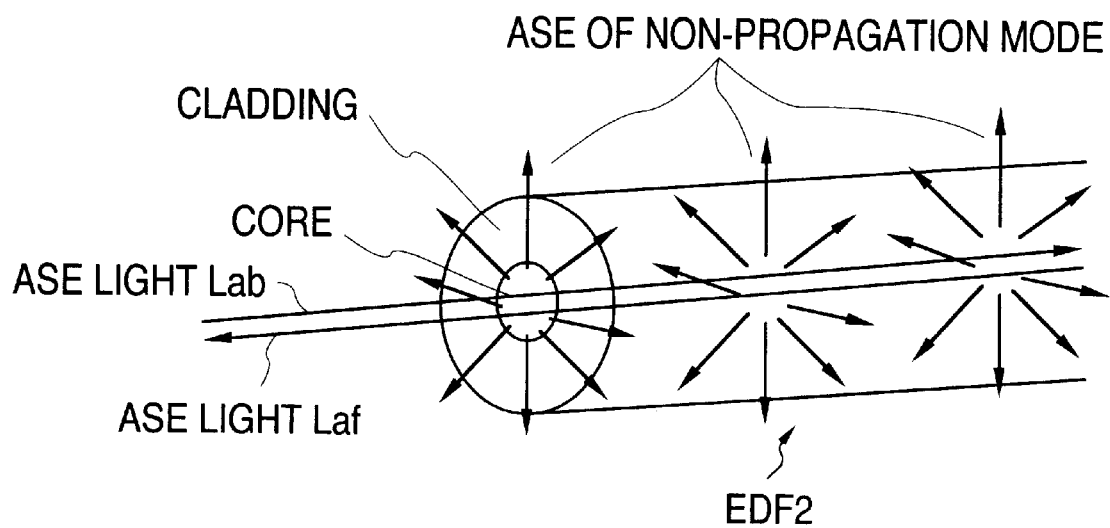
FIG. 3 (prior art) is a diagram illustrating an enlarged partial sectional view of an EDF used in an optical amplifier.

By virtue of the provision of EDF 2', those of ASE lights generated by Erbium atoms, which do not direct into any propagation modes, are reflected by ASE reflective coating 2D and are thereby confined within EDF 2'. As such, those 1.55 $\mu$m band ASEs, which are conventionally emitted outwardly from EDF 2 (as shown in FIG. 3), can be effectively utilized for optical amplification at 1.58 $\mu$m band, so that the excitation efficiency can be further enhanced.

Such an EDF 2' applied with ASE reflective coating 2D can be utilized in any of the aforementioned embodiments of the present invention, so that the excitation efficiency of the optical amplifier can be further improved by virtue of EDF 2'.

Figure 21:
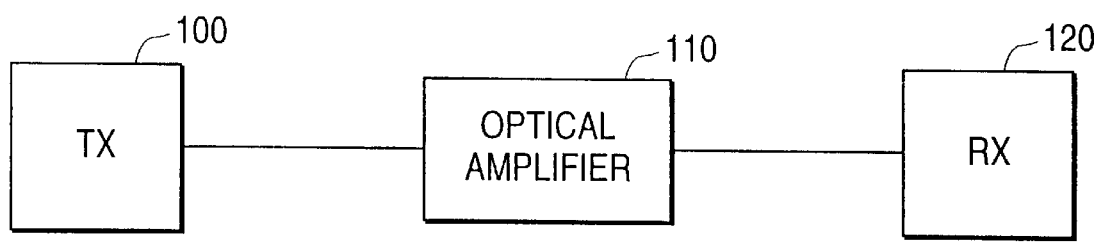
FIG. 21 is a diagram illustrating an optical communication system, according to an embodiment of the present invention.

FIG. 21 is a diagram illustrating an optical communication system, according to an embodiment of the present invention. Referring now to FIG. 21, a transmitter (TX) 100 transmits a light signal. An optical amplifier 110 amplifies the light signal. A receiver (RX) 120 receives the amplified light signal. Optical amplifier 110 can have a configuration as described above for any of the embodiments of the present invention. Moreover, transmitter 100 can be a transmitter which transmits a WDM signal, optical amplifier 110 can be an optical amplifier which amplifies the WDM signal, and receiver 120 can be a receiver which receives the WDM signal.

In the above embodiments of the present invention, explanation has been developed by assuming that the ASEs generated within the active optical fiber are at the 1.55 $\mu$m band and the signal light is at the 1.58 $\mu$m band. However, the present invention is not limited to such specific wavelength bands.

In the above embodiments of the present invention, an optical fiber is doped with Erbium for use in an optical amplifier. However, the present invention is not intended to be limited to use with optical fibers doped with "Erbium". Instead, the optical fiber can be doped with any rare earth element.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
    an optical fiber doped with a rare earth element and having a light signal travelling therethrough, an excitation light being provided to the optical fiber so that the light signal is amplified as the light signal travels through the optical fiber, spontaneous emission light being generated in the optical fiber and travelling in a direction out of the optical fiber; and
    a reflector reflecting the spontaneous emission light back into the optical fiber, wherein the light signal is a wavelength division multiplexed (WDM) light signal including a plurality of wavelengths in a signal wavelength band and multiplexed together, the spontaneous emission light being outside of the signal wavelength band, and the signal wavelength band is the 1.58 $\mu$m band.

2. An apparatus as in claim 1, wherein the reflected spontaneous emission light increases excitation efficiency in the optical fiber.

3. An apparatus as in claim 1, wherein the excitation light and the spontaneous emission light are at different wavelengths and are outside of the signal wavelength band.

4. An apparatus as in claim 2, wherein the excitation light and the spontaneous emission light are at different wavelengths and are outside of the signal wavelength band.

5. An apparatus as in claim 1, wherein the spontaneous emission light is amplified spontaneous emission light.

6. An apparatus as in claim 1, wherein
    the optical fiber has first and second ends, the light signal travelling through the optical fiber from the first end to the second end, and the generated spontaneous emission light travelling out of the first end of the optical fiber, and
    the reflector is positioned and has transmission characteristics so that the light signal passes through the reflector and into the first end of the optical fiber to be amplified in the optical fiber, and so that the spontaneous emission light is reflected by the reflector back into the optical fiber through the first end.

7. An apparatus as in claim 1, wherein
    the optical fiber has a first and second ends, the light signal travelling through the optical fiber from the first end to the second end, and the generated spontaneous emission light travelling out of the second end of the optical fiber, and
    the reflector is positioned and has transmission characteristics so that the light signal travels out of the second end of the optical fiber and then passes through the reflector, and so that the spontaneous emission light is reflected by the reflector back into the optical fiber through the second end.

8. An apparatus as in claim 1, wherein
    the optical fiber has a first and second ends, the light signal travelling through the optical fiber from the first end to the second end, and the generated spontaneous emission light including first generated spontaneous emission light travelling out of the first end of the optical fiber and second generated spontaneous emission light travelling out of the second end of the optical fiber, and
    the reflector includes
        a first reflector positioned so that the first generated spontaneous emission light is reflected back into the optical fiber through the first end, and
        a second reflector positioned so that the second generated spontaneous emission light is reflected back into the optical fiber through the second end of the optical fiber.

9. An apparatus as in claim 1, wherein
    the optical fiber has a first and second ends, the light signal travelling through the optical fiber from the first end to the second end,
    the excitation light is provided to one of the first and second ends of the optical fiber to travel through the optical fiber, and
    the reflector is positioned and has transmission characteristics so that the excitation light travels through the reflector before being provided to said one of the first and second ends of the optical fiber.

10. An apparatus as in claim 1, wherein the reflector comprises a grating which reflects the spontaneous emission light.

11. An apparatus as in claim 1, wherein the reflector comprises a grating which reflects the spontaneous emission light and transmits the light signal.

12. An apparatus as in claim 1, wherein the reflector comprises a grating formed in the optical fiber, the grating having characteristics so that the spontaneous emission light is reflected by the grating and the light signal is transmitted through the grating.

13. An apparatus as in claim 12, wherein the grating is formed along a longitudinal direction of the optical fiber.

14. An apparatus as in claim 11, wherein
the optical fiber has a first and second ends, the light signal travelling through the optical fiber from the first end to the second end, and
the grating is formed along the fiber near the first end.

15. An apparatus as in claim 11, wherein
the optical fiber has first and second ends, the light signal travelling through the optical fiber from the first end to the second end, and
the grating is formed along the fiber near the second end.

16. An apparatus as in claim 1, wherein
the optical fiber has first and second ends, the excitation light being provided to one of the first and second ends to travel through the optical fiber, and
the apparatus further comprises an excitation light reflector positioned near the other of said one of the first and second ends, to reflect the excitation light back into the optical fiber.

17. An apparatus as in claim 16, wherein the excitation light reflector has characteristics so that the light signal is transmitted through the excitation light reflector.

18. An apparatus as in claim 16, wherein the excitation light reflector is a grating.

19. An apparatus as in claim 16, wherein the excitation light reflector is a grating formed in the optical fiber.

20. An apparatus as in claim 16, further comprising:
an excitation light source generating the excitation light and providing the generated excitation light to the optical fiber, and
a device preventing the reflected excitation light from entering the excitation light source.

21. An apparatus as in claim 20, wherein the device is an optical isolator.

22. An apparatus as in claim 20, wherein the device is an optical circulator.

23. An apparatus as in claim 16, further comprising:
an excitation light source generating the excitation light and providing the generated excitation light to the optical fiber, and
means for preventing the reflected excitation light from entering the excitation light source.

24. An apparatus as in claim 1, wherein the reflector is a reflecting layer provided on the optical fiber.

25. An apparatus as in claim 1, wherein the reflector is a reflecting layer provided on a clad surface of the optical fiber.

26. An apparatus as in claim 5, wherein the excitation light and the spontaneous emission light are at different wavelengths and are outside of the signal wavelength band.

27. An apparatus as in claim 6, wherein the excitation light and the spontaneous emission light are at different wavelengths and are outside of the signal wavelength band.

28. An apparatus as in claim 7, wherein the excitation light and the spontaneous emission light are at different wavelengths and are outside of the signal wavelength band.

29. An apparatus as in claim 8, wherein the excitation light and the spontaneous emission light are at different wavelengths and are outside of the signal wavelength band.

30. An apparatus as in claim 9, wherein the excitation light and the spontaneous emission light are at different wavelengths and are outside of the signal wavelength band.

31. An apparatus as in claim 10, wherein the excitation light and the spontaneous emission light are at different wavelengths and are outside of the signal wavelength band.

32. An apparatus as in claim 11, wherein the excitation light and the spontaneous emission light are at different wavelengths and are outside of the signal wavelength band.

33. An apparatus as in claim 12, wherein the excitation light and the spontaneous emission light are at different wavelengths and are outside of the signal wavelength band.

34. An apparatus as in claim 13, wherein the excitation light and the spontaneous emission light are at different wavelengths and are outside of the signal wavelength band.

35. An apparatus as in claim 14, wherein the excitation light and the spontaneous emission light are at different wavelengths and are outside of the signal wavelength band.

36. An apparatus as in claim 15, wherein the excitation light and the spontaneous emission light are at different wavelengths and are outside of the signal wavelength band.

37. An apparatus as in claim 16, wherein the excitation light and the spontaneous emission light are at different wavelengths and are outside of the signal wavelength band.

38. An apparatus as in claim 17, wherein the excitation light and the spontaneous emission light are at different wavelengths and are outside of the signal wavelength band.

39. An apparatus as in claim 18, wherein the excitation light and the spontaneous emission light are at different wavelengths and are outside of the signal wavelength band.

40. An apparatus as in claim 19, wherein the excitation light and the spontaneous emission light are at different wavelengths and are outside of the signal wavelength band.

41. An apparatus as in claim 20, wherein the excitation light and the spontaneous emission light are at different wavelengths and are outside of the signal wavelength band.

42. An apparatus as in claim 21, wherein the excitation light and the spontaneous emission light are at different wavelengths and are outside of the signal wavelength band.

43. An apparatus as in claim 22, wherein the excitation light and the spontaneous emission light are at different wavelengths and are outside of the signal wavelength band.

44. An apparatus as in claim 23, wherein the excitation light and the spontaneous emission light are at different wavelengths and are outside of the signal wavelength band.

45. An apparatus as in claim 24, wherein the excitation light and the spontaneous emission light are at different wavelengths and are outside of the signal wavelength band.

46. An apparatus as in claim 25, wherein the excitation light and the spontaneous emission light are at different wavelengths and are outside of the signal wavelength band.

47. An apparatus as in claim 1, wherein the reflected spontaneous emmission is in the 1.55 $\mu$m band.

48. An optical fiber comprising:
a grating formed in the optical fiber, wherein
the optical fiber is doped with a rare earth element,
a light signal travels through the optical fiber,
an excitation light is provided to the optical fiber so that the light signal is amplified as the light signal travels through the optical fiber, spontaneous emission light being generated in the optical fiber and travelling in a direction out of the optical fiber, and the grating reflects the spontaneous emission light back into the optical fiber so that the reflected spontaneous emission light improves excitation efficiency in the optical fiber, wherein the light signal is a wavelength division multiplexed (WDM) light signal including a plurality of wavelengths in a signal wavelength band and multiplexed together, the spontaneous emission light being outside of the signal wavelength band, and the signal wavelength band is the 1.58 μm band.

49. An optical fiber as in claim 48, wherein the excitation light and the spontaneous emission light are at different wavelengths and are outside of the signal wavelength band.

50. An optical fiber as in claim 48, wherein the grating is formed along a longitudinal direction of the optical fiber.

51. An optical fiber as in claim 48, further comprising a reflecting layer provided on a clad surface of the optical fiber to reflect spontaneous emission light back into the optical fiber.

52. An optical fiber as in claim 50, wherein the excitation light and the spontaneous emission light are at different wavelengths and are outside of the signal wavelength band.

53. An optical fiber as in claim 51, wherein the excitation light and the spontaneous emission light are at different wavelengths and are outside of the signal wavelength band.

54. An optical fiber as in claim 48, wherein the reflected spontaneous emmission is in the 1.55 μm band.

55. An apparatus comprising:
an optical fiber doped with a rare earth element, wherein
a light signal travels through the optical fiber,
an excitation light is provided to the optical fiber so that the light signal is amplified as the light signal travels through the optical fiber, amplified spontaneous emission (ASE) being generated in the optical fiber and travelling in a direction out of the optical fiber, and
the light signal, the excitation light and the ASE are in first, second and third wavelength bands, respectively, and which are different from each other; and
a reflector reflecting the ASE back into the fiber so that the reflected ASE improves excitation efficiency in the optical fiber, wherein the light signal is a wavelength division multiplexed (WDM) light signal including a plurality of wavelengths in the first wavelength band and multiplexed together, the ASE being outside of the first wavelength band, and the first wavelength band is the 1.58 μm band.

56. An apparatus as in claim 55, wherein
the optical fiber has first and second ends, the light signal travelling through the optical fiber from the first end to the second end,
the excitation light is provided to one of the first and second ends of the optical fiber to travel through the optical fiber, and
the reflector is positioned and has transmission characteristics so that the excitation light travels through the reflector before being provided to said one of the first and second ends of the optical fiber.

57. An apparatus as in claim 55, wherein the reflector is a grating formed in the optical fiber.

58. An apparatus as in claim 55, wherein the third wavelength band is the 1.55 μm band.

59. An apparatus comprising:
an optical fiber doped with a rare earth element, wherein
a light signal travels through the optical fiber, and
an excitation light is provided to the optical fiber so that the light signal is amplified as the light signal travels through the optical fiber, spontaneous emission being generated in the optical fiber and travelling in a direction out of the optical fiber; and
a reflector reflecting the spontaneous emission back into the optical fiber so that the reflected spontaneous emission improves excitation efficiency in the optical fiber, wherein the light signal is a wavelength division multiplexed (WDM) light signal including a plurality of wavelengths in a signal wavelength band and multiplexed together, the spontaneous emission being outside of the signal wavelength band, and the wavelength band is the 1.58 μm band.

60. An apparatus as in claim 59, wherein
the optical fiber has a first and second ends, the light signal travelling through the optical fiber from the first end to the second end,
the excitation light is provided to one of the first and second ends of the optical fiber to travel through the optical fiber, and
the reflector is positioned and has transmission characteristics so that the excitation light travels through the reflector before being provided to said one of the first and second ends of the optical fiber.

61. An apparatus as in claim 59, wherein the reflector is a grating formed in the optical fiber.

62. An apparatus as in claim 59, wherein the excitation light and the spontaneous emission are at different wavelengths and are outside of the signal wavelength band.

63. An apparatus as in claim 60, wherein the excitation light and the spontaneous emission are at different wavelengths and are outside of the signal wavelength band.

64. An apparatus as in claim 61, wherein the excitation light and the spontaneous emission are at different wavelengths and are outside of the signal wavelength band.

65. An apparatus as in claim 59, wherein the reflected spontaneous emission is in the 1.55 μm band.

66. An apparatus comprising:
an optical amplifier which generates spontaneous emission while amplifying a light signal, the spontaneous emission travelling in a direction out of the optical amplifier; and
a reflector reflecting the spontaneous emission back into the optical amplifier so that the reflected spontaneous emission improves efficiency of the optical amplifier, wherein the light signal is a wavelength division multiplexed (WDM) light signal including a plurality of wavelengths in a signal wavelength band and multiplexed together, the spontaneous emission being outside of the signal wavelength band, and the signal wavelength band is the 1.58 μm band.

67. An apparatus as in claim 66, wherein
the optical amplifier includes a rare earth doped optical fiber through which the light signal travels, and
the reflector is a grating formed in the optical fiber.

68. An apparatus as in claim 66, wherein the reflected spontaneous emission is in the 1.55 μm band.

69. An apparatus comprising:
an optical fiber doped with a rare earth element and having a light signal travelling therethrough, an excitation light being provided to the optical fiber so that the light signal is amplified as the light signal travels through the optical fiber, spontaneous emission light being generated in the optical fiber and travelling in a direction out of the optical fiber; and
means for reflecting the spontaneous emission light back into the optical fiber so that the reflected spontaneous emission light improves excitation efficiency in the optical fiber, wherein the light signal is a wavelength division multiplexed (WDM) light signal including a plurality of wavelengths in a signal wavelength band and multiplexed together, the spontaneous emission light being outside of the signal wavelength band, and the signal wavelength band is the 1.58 μm band.

70. An apparatus as in claim 69, wherein the excitation light and the spontaneous emission light are at different wavelengths and are outside of the signal wavelength band.

71. An apparatus as in claim 69, wherein the reflected spontaneous emission is in the 1.55 μm band.

72. A method comprising:

providing an optical fiber doped with a rare earth element;

causing a light signal to travel through the optical fiber;

providing an excitation light to the optical fiber so that the light signal is amplified as the light signal travels through the optical fiber, spontaneous emission light being generated in the optical fiber and travelling in a direction out of the optical fiber; and reflecting the spontaneous emission light back into the optical fiber so that the reflected spontaneous emission improves excitation efficiency in the optical fiber, wherein the light signal is a wavelength division multiplexed (WDM) light signal including a plurality of wavelengths in a signal wavelength band and multiplexed together, the spontaneous emission light being outside of the signal wavelength band, and the signal wavelength band is the 1.58 μm band.

73. A method as in claim 72, wherein the excitation light and the spontaneous emission light are at different wavelengths and are outside of the signal wavelength band.

74. A method as in claim 72, wherein the reflected spontaneous emission is in the 1.55 μm band.

75. An optical communication system comprising:

a transmitter transmitting a light signal;

an optical amplifier amplifying the light signal, the optical amplifier including an optical fiber doped with a rare earth element, the light signal travelling through the optical fiber, an excitation light being provided to the optical fiber so that the light signal is amplified as the light signal travels through the optical fiber, spontaneous emission light being generated in the optical fiber and travelling in a direction out of the optical fiber, and a reflector reflecting the spontaneous emission light back into the optical fiber so that the reflected spontaneous emission light improves excitation efficiency in the optical fiber; and a receiver receiving the amplified light signal, wherein the light signal is a wavelength division multiplexed (WDM) light signal including a plurality of wavelengths in a signal wavelength band and multiplexed together, the spontaneous emission light being outside of the signal wavelength band, and the signal wavelength band is the 1.58 μm band.

76. An optical communication system as in claim 75, wherein the excitation light and the spontaneous emission light are at different wavelengths and are outside of the signal wavelength band.

77. An optical communication system as in claim 75, wherein the reflected spontaneous emission is in the 1.55 μm band.

78. An apparatus comprising:

an optical amplifier amplifying a light, thereby generating spontaneous emission travelling in a direction out of the optical amplifier; and a reflector reflecting the spontaneous emission back into the optical amplifier, the spontaneous emission having characteristics so that the reflected spontaneous emission improves efficiency of the optical amplifier, wherein the light is a wavelength division multiplexed (WDM) light including a plurality of wavelengths in a signal wavelength band and multiplexed together, the spontaneous emission being outside of the signal wavelength band, and the signal wavelength band is the 1.58 μm band.

79. An apparatus as in claim 78, wherein the reflected spontaneous emission is in the 1.55 μm band.

* * * * *

UNITED STATES PATENT AND TRADEMARK OFFICE
CERTIFICATE OF CORRECTION

PATENT NO. : 6,501,592 B2
DATED : December 31, 2002
INVENTOR(S) : Takafumi Terahara It is certified that error appears in the above-identified patent and that said Letters Patent is hereby corrected as shown below:

<u>Title page,</u>
Item [56], References Cited, U.S. PATENT DOCUMENTS, please add the following documents:
-- 5,257,273    10/1993    Farris et al.
5,506,724       4/1996     Shimizu et al.

FOREIGN PATENT DOCUMENTS, please add:
-- EP    1 030 415 A2    8/2000
GB       2 340 297 A     2/2000
EP       954 070 A3      4/2001

OTHER PUBLICATIONS, please add:
-- Nilsson, J., et al., "Long-Wavelength Erbium-Doped Fiber Amplifier Gain Enhanced by ASE End-Reflectors", IEEE Photonics Technol. Letters, Vol. 10, No. 11, Nov. 1988, pgs. 1551-1553

Riant, I., et al. "20% Pump Power Saving Using Photoinduced Intracore Fibre Bragg Grating In Erbium Doped Fibre Amplifier", 8030 Electronics Letters, Vol. 30., No. 3, Feb. 3, 1994, pgs. 221-223 --

Signed and Sealed this

Twenty-seventh Day of May, 2003

JAMES E. ROGAN
*Director of the United States Patent and Trademark Office*